United States Patent
Davies et al.

(10) Patent No.: US 7,622,430 B2
(45) Date of Patent: *Nov. 24, 2009

(54) DELAYED-GELATION SOLUTION

(75) Inventors: Stephen Davies, Doha (QA); Trevor Hughes, Cambridge (GB); Henk Lekkerkerker, Maarn (NL); Michel Van Bruggen, Helmond (NL); Arnaud Van Der Beken, Brussels (BE)

(73) Assignee: Schlumberger Technology Corporation, Ridgefield, CT (US)

( * ) Notice: Subject to any disclaimer, the term of this patent is extended or adjusted under 35 U.S.C. 154(b) by 13 days.

This patent is subject to a terminal disclaimer.

(21) Appl. No.: 11/841,199

(22) Filed: Aug. 20, 2007

(65) Prior Publication Data

US 2007/0284102 A1 Dec. 13, 2007

Related U.S. Application Data

(62) Division of application No. 10/524,364, filed on Sep. 12, 2005, now Pat. No. 7,273,101.

(51) Int. Cl.
*C09K 8/74* (2006.01)
(52) U.S. Cl. ........................... 507/277; 507/269
(58) Field of Classification Search ................ 507/269, 507/277
See application file for complete search history.

(56) References Cited

U.S. PATENT DOCUMENTS

| 2,492,790 | A | 12/1949 | Farkas et al |
| 2,766,130 | A | 10/1956 | Kronberg |
| 2,968,572 | A | 1/1961 | Peeler, Jr. |
| 3,028,340 | A | 4/1962 | Gandon et al |
| 3,149,985 | A | 9/1964 | Gandon |
| 3,288,040 | A | 11/1966 | Burrows |
| 3,294,846 | A | 12/1966 | Livak et al. |
| 3,730,272 | A | 5/1973 | Richardson et al |
| 3,747,677 | A | 7/1973 | Richardson |

(Continued)

FOREIGN PATENT DOCUMENTS

| GB | 973829 | 10/1964 |
| JP | 7-127047 A | 5/1995 |

OTHER PUBLICATIONS de Silva, Preparation and characterization of hydrous zirconium oxide formed by homogeneous precipitation, Materials Research, vol. 5 No. 2, 149-153, 2002.*

(Continued)

*Primary Examiner*—Timothy J. Kugel
*Assistant Examiner*—Alicia M Toscano
(74) *Attorney, Agent, or Firm*—James McAleenan; Jody DeStefanis; Dale Gaudier

(57) ABSTRACT

The invention concerns an aqueous delayed-gelation solution for use in hydrocarbon wells. According to the invention, the aqueous delayed-gelation solution a dissolved metal salt which, in use, hydrolyses to form a gel, wherein the solution contains suspended inorganic particles and the method comprises the steps of—providing the aqueous delayed-gelation solution, and—injecting the solution into the hydrocarbon well, whereby the suspended inorganic particles reduce or block the flow of the delayed-gelation solution to relatively low permeability formation zones thereby selectively placing the solution in a relatively high permeability formation zone.

7 Claims, 28 Drawing Sheets

U.S. PATENT DOCUMENTS

| | | | | |
|---|---|---|---|---|
| 3,815,681 | A | * | 6/1974 | Richardson .................. 166/281 |
| 4,889,563 | A | * | 12/1989 | Parker et al. ........... 106/287.17 |
| 6,059,036 | A | * | 5/2000 | Chatterji et al. ............. 166/294 |
| 6,599,863 | B1 | | 7/2003 | Palmer et al. |

OTHER PUBLICATIONS

Santos, Characterization of the aluminum hydroxide formed by homogeneous precipitation from some aluminum salts and precipitants, Anail assoc bras quim, 46(1), 16-20, 1997.*

Krumrine, Profile modification and water control with silica gel-based systems SPE 13578, 1985 pp. 317-325.*

Blatt et al: "Origin of sedimentary rocks", Prentice-Hall Inc, Englewood Cliffs, New Jersey USA 1980, p. 231.

Bottero et al: "Mechanism of formation of aluminum trihydroxide from Keggin Al13 polymers", Journal of Colloid & Interface Science, vol. 117, No. 1, 1987, pp. 47-57.

Borchardt: "In-situ gelation of silicates in drilling, well completion and oil production", Colloids and Surfaces, vol. 63, 1992, pp. 189-199.

Buining et al: "Preparation of a non-aqueous dispersion of sterically stabilized boehmite rods", Colloids and Surfaces, vol. 64, 1992, pp. 47-55.

Da Silva et al: "Preparation and characterization of hydrous zirconium oxide formed by homogeneous precipitation", Materials Research, vol. 5, No. 2, 2002, pp. 149-153.

Johansson: "On the crystal structure of the basic aluminum sulfate 13 A1203 6S03 ×H20", Arkiv föor Kemi, vol. 20, No. 27, 1962, pp. 321-342.

Johansson: "The crystal structure of a basic aluminum selenate", Arkiv för Kemi, vol. 20, No. 26, 1962, pp. 305-319.

Krumrine et al: "Profile modification and water control with silica gel-based systems", Presented at the International Symposium on Oilfield and Geothermal Chemistry held in Phoenix, Arizona, USA, Apr. 1985, SPE 13578.

Merrill et al: "Gelation of sodium silicate: effect of sulfuric acid, hydrochloric acid, ammonium sulfate and sodium aluminate", Philadelphia Quartz Company, Philadelphia, Pennsylvania, 1949, pp. 806-812.

Philipse et al: "Isotropic and birefringent dispersions of surface modified silica rods with a boehmite-needle core", Langmuir, 1994, vol. 10 pp. 4451-4458.

Santos et al: "Characterization of the aluminum hydroxide formed by homogeneous precipitation from some aluminum salts and precipitants", Anais Assoc. Bras. Quim, 46(1), 1997, pp. 16-20.

Seright et al: "A comparison of different types of blocking agents", Presented at the European Formation Damage Conference, held in the Hague, The Netherlands, May 1995, SPE 30120.

Seright: "Improved techniques for fluid diversion in oil recovery", Second annual report, Oct. 1, 1993 to Sep. 30, 1994, DOE/BC/14880-10, Mar. 1995, U.S. Department of Energy.

Sparlin et al: "Controlling water in producing operations", World Oil, Jun. 1984, pp. 149-154.

Van Bruggen: "Preparation and properties of colloidal core-shell rods with adjustable aspect ratios", Chapter 2 of PhD thesis: Liquid crystal formation and diffusion in dispersions of colloidal rods, 1998.

Pathmamanoharan: "Preparation of Monodisperse Polyisobutene Grafted Silica Dispersion", Colloids and Surfaces, 1988/89, vol. 34, pp. 81-88.

* cited by examiner

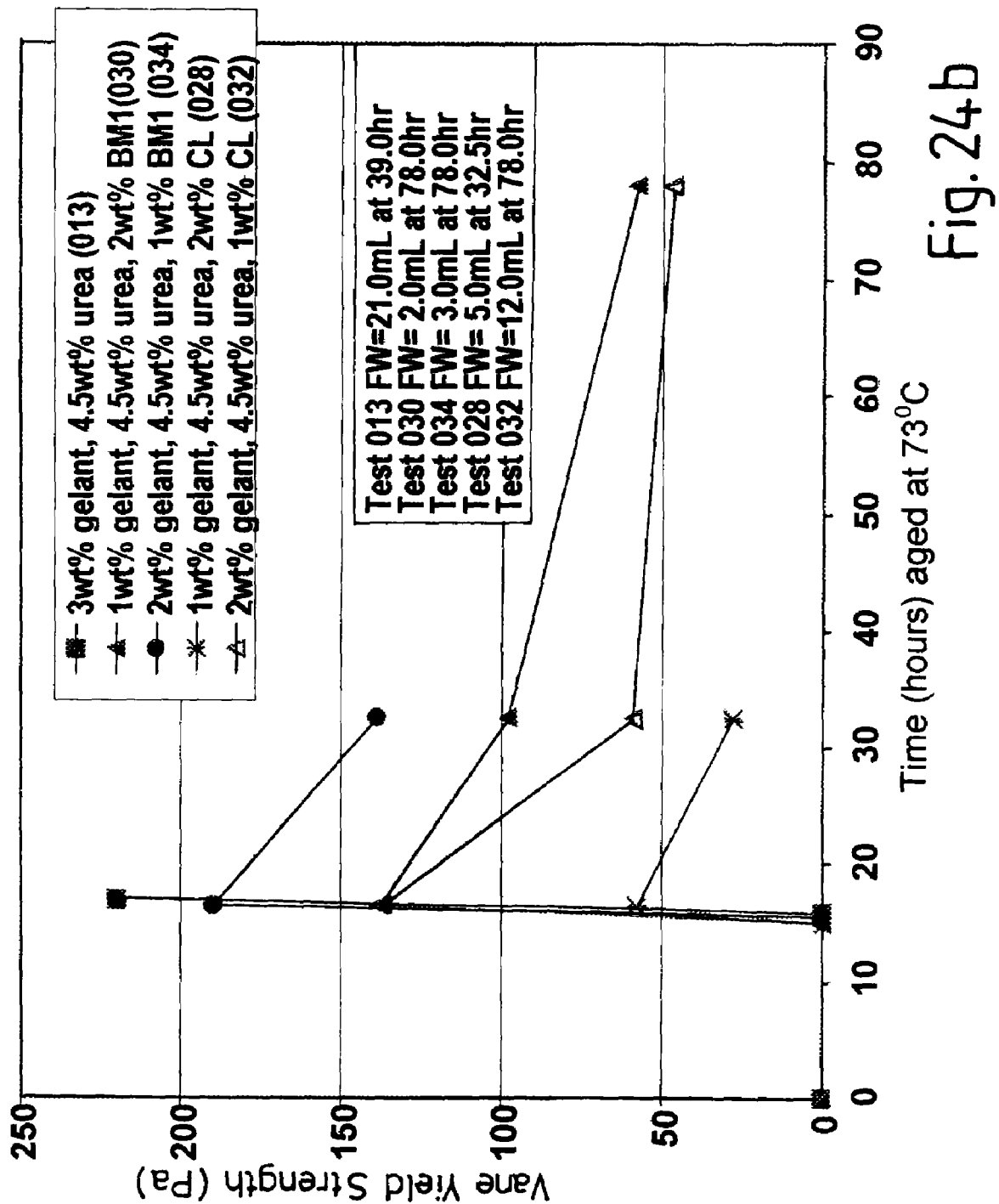

DELAYED-GELATION SOLUTION

CROSS-REFERENCE TO RELATED APPLICATIONS

This application is a divisional of application Ser. No. 10/524,364, entitled "DELAYED-GELATION SOLUTION", filed in the United States on Sep. 12, 2005, and which was a national phase (371) of PCT/GB2003/003645 filed on 20 Aug. 2003 and claims priority to GB 0220006.1, entitled "DELAYED-GELATION SOLUTION", filed in the United Kingdom on Aug. 29, 2002. All of which are commonly assigned to assignee of the present invention and hereby incorporated by reference in their entirety.

FIELD OF THE INVENTION

The present invention relates to delayed-gelation solutions, and has applications for the treatment of hydrocarbon wells.

BACKGROUND OF THE INVENTION

During the production of hydrocarbons from underground formations, it is often desirable to reduce the permeability of certain zones in the formation. This is the case, for example, when a formation next to the production well is likely to direct water into the well. Another example is where there are zones of high permeability next to the injection well.

One method of reducing the permeability of an underground zone entails introducing into the zone a fluid with the intrinsic potential of creating a gel by precipitation of a solid phase. Typically it is necessary to control two parameters, which are the delay required for the formation of the gel, and the morphology of the solid phase that is produced during gelation; the delay determines the possible degree of penetration into the formation, while the morphology of the solid phase determines the degree to which the permeability of the formation will be reduced.

Numerous simple salts of aluminum III (such as aluminum chloride or aluminum nitrate) are soluble in slightly acid mediums, but form insoluble aluminum hydroxides when the pH level goes above about 5. Delayed formation gels based on such hydroxides can be generated from solutions consisting of a suitable aluminum salt and an activator. For example, the activator is used to slowly increase the pH level of the solution in the temperature range normally existing at well bottoms, and this in turn leads to the delayed formation of an insoluble hydroxide phase. A suitable activator is urea, which undergoes hydrolysis at high temperature, with formation of ammonia; the latter in turn increases the pH of the solution. The solid aluminum hydroxide precipitate phase has a tendency to stay amorphous, with the consistency of a gel.

U.S. Pat. No. 4,889,563 describes a composition in which aluminum hydroxychloride is used instead of aluminum chloride, providing various operational advantages. The activator for the composition is urea, urea derivative or hexamethylenetetramine.

U.S. Pat. No. 3,730,272 also describes inorganic gelling fluids for reducing permeability to modify an injection profile. The fluids comprise polyvalent metal salts that form gelatinous metal hydroxides or hydrated metal oxides of very low water solubility. The patent mentions the use of a range of polyvalent metals including aluminum, chromium, iron, copper and bismuth, such metals being used in the form of water-soluble salts such as chlorides, nitrates or acetates. However, the examples focus on the use of aluminum chloride. A pH-increasing reactant such as urea is used to trigger gelation/precipitation and, for applications in the lower temperature range, a water-soluble nitrite salt is used to accelerate the gelation/precipitation process.

The use in hydrocarbon well applications of gelling systems based on sodium silicate solutions is also known. See for example, P. H. Krumine and S. D. Boyce, "Profile modification and water control with silica gel-based systems", SPE 13578, 1985; D. D. Sparlin and R. W. Hagen, "Controlling water in producing operations", World Oil, June 1984; and J. K. Borchardt, "In-situ gelation of silicates in drilling, well completion and oil production", Colloids and Surfaces, Vol. 63, 189, (1992).

R. S. Seright and J. Liang, "A comparison of different types of blocking agents", SPE 30120, pp 431-440, reviews issues of placement and permeability reduction in respect of various fluid diversion processes. R. S. Seright, "Improved Techniques for fluid diversion in oil recovery processes", Second annual report DOE/BC/14880-10, US DOE, February 95, develops theoretical models relating to the feasibility of using particles to prevent gelant penetration into low permeability zones during placement.

SUMMARY OF THE INVENTION

An object of the present invention is to provide delayed-gelation systems for selective placement in well formation zones and/or with improved gel strength and stability.

In general terms the present invention provides an inorganic delayed-gelation solution which contains suspended inorganic particles. In use, the solution is activated to form a gel.

We have found that suitable delayed-gelation solutions may be based on dissolved metal salts. Thus, more specifically, in a first aspect the present invention provides an aqueous delayed-gelation solution comprising a dissolved metal salt which, in use, hydrolyses to form a gel, wherein the solution contains suspended inorganic particles.

In such a system, the dissolved metal salt and suspended inorganic particles can be selected such that the inorganic particles are compatible with the solution and/or with the gel formed from the solution. For example, in preferred embodiments the inorganic particles are chemically stable with respect to the solution and the gel. In further preferred embodiments, the particles are physically stable, e.g. so that they remain suspended and do not flocculate in the solution.

Preferably, the dissolved metal salt is a polyvalent metal salt, and more preferably an aluminum salt such as an aluminum halide or a hydrated aluminum halide. The gelation times of solutions based on such salts can be readily controlled, e.g. by use of suitable activators. Indeed, preferably, the solution further comprises a hydrolysation activator, such as a pH-increasing reactant. A typical such reactant is urea or urea derivative.

Alternatively, the dissolved metal salt may be e.g. a sodium silicate.

We have been able to identify compatible inorganic particles for use with various delayed gelation solutions. For example, for use with delayed gelation solutions based on aluminum salts, the suspended inorganic particles may be formed from alumina or aluminum hydrate, or have alumina or aluminum hydrate coatings. Conversely, for use with delayed gelation solutions based on sodium silicate, the suspended inorganic particles may be formed from silica or have silica coatings.

Furthermore, we have performed experiments which show that careful selection of the particle size distribution of the suspended inorganic particles enables the particles to block penetration of the delayed-gelation solution into low permeability rock formations. In this way, the delayed gelation solution can be selectively placed in higher permeability target formation zones. Essentially, the suspended inorganic particles should block fluid flow into low permeability zones by forming filter cake on the well bore rock face of the low permeability zones and/or by forming crossflow barriers at the interface between the low and high permeability zones.

We have also found that the suspended inorganic particles can strengthen and stabilise the gel formed from the solution. In particular, significant gel strengthening can be achieved when the particles are elongate, i.e. rod- or needle-shaped. Thus in one embodiment the particles are elongate.

Preferably, the particles have a mean aspect ratio of at least 8, and more preferably of at least 16, the degree of gel strengthening tending to increase with aspect ratio.

Conveniently, the elongate particles may be boehmite needles. Such needles are compatible with delayed gelation solutions based on aluminum salts. However, for use with delayed gelation solutions based on sodium silicate, the needles may be coated with silica.

A further aspect of the present invention provides for the use of the delayed-gelation solution of the first aspect for treating a hydrocarbon well.

Another aspect of the present invention provides a method of selectively placing a delayed-gelation solution in a hydrocarbon well, the method comprising the steps of:
  providing the aqueous delayed-gelation solution of the first aspect, and
  injecting the solution into the hydrocarbon well, whereby the suspended inorganic particles reduce or block the flow of the delayed-gelation solution to relatively low permeability formation zones thereby selectively placing the solution in a relatively high permeability formation zone.

Another aspect of the present invention provides a method of reducing the permeability of a formation zone of a hydrocarbon well, the method comprising the steps of:
  providing the aqueous delayed-gelation solution of the first aspect,
  placing the solution in the formation zone, and
  allowing the dissolved metal salt to hydrolyse, thereby forming a gel which contains suspended inorganic particles and which reduces the permeability of the zone.

BRIEF DESCRIPTION OF THE DRAWINGS

Embodiments of the present invention will now be described, by way of example only, with reference to the accompanying drawings, in which.

DETAILED DESCRIPTION

Figure 1:
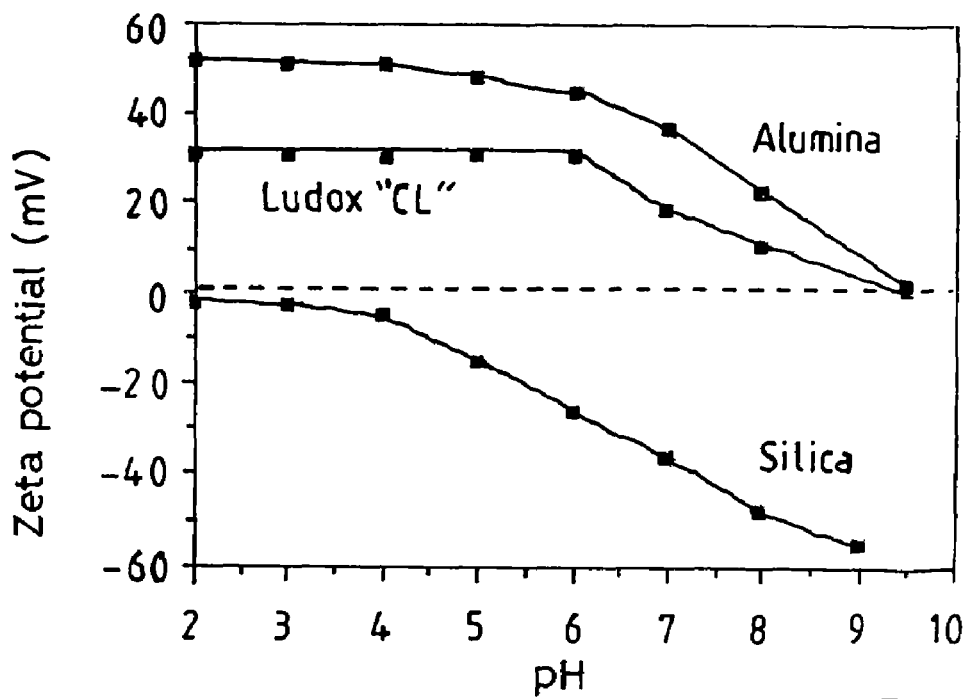
FIG. 1 shows measurements of the zeta potential of colloidal alumina, Ludox CL12 and colloidal silica particles as a function of pH.

The present invention relates to a delayed-gelation solution laden with inorganic particles which are typically chemically compatible with the solution and with the gel which is formed from the solution.

A delayed-gelation system may be based on the controlled hydrolysis of aluminum species starting from an aqueous solution of aluminum chloride and/or aluminum chlorohydrate, $Al_2(OH)_mCl_n$, where m is in the range 4-5, n is in the range 1-2 and (m+n)=6. For example, as described in U.S. Pat. No. 4,889,563, the pre-gel solution may contain the gelant component, together with a dissolved activator component (or a combination of activator components). The gelant material $Al_2(OH)_5Cl$ is commercially available e.g. as "Locron" ($Al_2(OH)_5Cl.2.5H_2O$) marketed by Hoescht A. G., Germany. The activator may be a weak organic base; some typical activators are sodium cyanate, urea and urea derivatives such as dialkyl ureas.

A freshly prepared pre-gel solution of $Al_2(OH)_5Cl$, should have a molar ratio [OH]/[Al]=2.5 and a pH in the range 4-4.5. As the activator component(s) decompose, via acid hydrolysis reactions, the molar ratio [OH]/[Al] and the pH of the solution increase. When [OH]/[Al]=2.6, aggregates of the predominant polynuclear species, $[Al_{13}O_4(OH)_{24}(H_2O)_{12}]^{7+}$ (radius of gyration 0.41 nm, G. Johansson, "The crystal structure of a basic aluminum selenate", Ark. Kemi., Vol. 20, 305, (1962) and G. Johansson, "On the crystal structure of a basic aluminum selenate", Ark. Kemi., Vol. 20, 321, (1962)) form fine precipitates with diameters in the range 20-100 nm (J. Y. Bottero et al., J. Colloid Int. Sci., Vol. 117, 47, (1987)) and, at this stage, the solution becomes turbid. A solid gel is formed when the molar ratio [OH]/[Al] reaches 2.75-2.85 (at pH 5.5±0.2). By selecting the appropriate activator, the gel time can be controlled in the range 12-96 hours at fluid temperatures in the range 45-140° C.

Evaluation of Chemical Compatibility

Inorganic particles composed of a surface-modified colloidal silica were added to the above system. The particles are positively charged in the pre-gel solution due to an alumina surface coating. Suitable alumina-coated colloidal silica suspensions are commercially available from Grace Davison, Columbia, Md., USA (a division of W.R. Grace & Co.); the relevant product range is "Ludox CL". This product is also available from Sigma-Aldrich Company Ltd., Gillingham, Dorset, UK. Some representative electron micrographs of two Ludox CL products have been obtained. Ludox CL12 has a mean particle diameter of 12 nm; 95% of the particle diameters are within 15-20% of the mean diameter, i.e. 95% of the particles have diameters within the range 10-14 nm. Thus, Ludox CL12 has a near-monodisperse particle size distribution. Ludox WPH-CL has an intentionally bimodal distribution of particle diameters, the smaller particles having a diameter 10-12 nm and the larger ones 35-40 nm.

Alternatively, an alumina-coated colloidal silica suspension can be formed by the following process: (1) a basic aluminum chloride or aluminum chlorohydrate salt (e.g. as used in the gelling system described above) is added to an acidic colloidal silica sol, (2) sodium hydroxide is added to raise the pH to 4.5 and (3) the system is heated to 80-100° C. to coat the colloidal silica particles with alumina. Similar processes can be used to coat colloidal silica with Zr or Ti. The particle diameter of the surface-modified colloidal silica particles is determined by that of the original colloidal silica sol. Thus, the mean particle diameter can be varied in the range 10-200 nm (0.01-0.2 μm).

FIG. 1 shows measurements of the zeta potential of colloidal alumina, Ludox CL12 and colloidal silica particles as a function of pH. The point of zero charge of colloidal silica occurs around pH 2; at this pH, uncharged silica particles can collide and coagulate (R. K. Iler, "The chemistry of silica", Wiley-Interscience publication (1979)). At pH>7, the surface of the colloidal silica particles develops a negative charge which is sufficient to induce a mutual repulsion between the particles, and the suspension becomes charge-stabilised. The data show that (i) the colloidal alumina particles and the alumina-coated Ludox CL12 particles carry a positive surface charge and (ii) their surface charge density is at a maximum in the pH range 2-6. Thus, Ludox CL12 particles maintain a stabilising positive charge throughout the pH range (4-5.5) of the delayed inorganic gelling system described above.

Thus the surface chemistry and surface charge of the alumina-coated colloidal silica particles is matched to that of the delayed inorganic gelling system when the latter is based on the gradual hydrolysis of aluminum chloride and/or aluminum chlorohydrate gelant(s). On the other hand, non-modified colloidal silica particles are not compatible with or stable within such a gelling system because (i) the active pH range (4-5.5) reduces the stabilising negative charge on the particles (see FIG. 1) and (ii) the positively charged aluminum species further neutralises the stabilising negative charge on the particles resulting in a rapid flocculation process.

The stability of alumina-coated colloidal silica particles as a function of the ionic composition of the solution and the compatibility of the particles with a delayed aluminum gelling system is described in the following Examples 1-4.

In particular, as the particle-laden pre-gel solutions will contact and mix with formation brines during placement, it is important to evaluate the stability of the particles and the associated gelling system as a function of the ionic composition of the solution. Typically, the particle-laden pre-gel solution is prepared using a freshwater or seawater basefluid; then, during placement, the fluid contacts and mixes with more saline formation waters residing in the pore space of the invaded reservoir rocks. The major dissolved inorganic constituents in sandstone formation brines are usually sodium (typically, in the concentration range 0.1-3.5 mol/L), calcium (up to ≈0.2 mol/L), magnesium (up to ≈0.08 mol/L), chloride (0.1-4.0 mol/L), bicarbonate (up to ≈0.03 mol/L) and sulphate (up to 0.03 mol/L) (H. Blatt et al., "Origin of Sedimentary Rocks", Prentice-Hall Inc., Englewood Cliffs, N.J., USA, (1980)). As the alumina-coated silica particles and the complex aluminum species in the associated gelling system carry a positive charge, it is particularly important to evaluate their tolerance to the presence of divalent anions which might be expected to induce flocculation/precipitation in the system.

Examples 1-3 are evaluations of the stability of the alumina-coated silica particles and the associated delayed gelling system as a function of respectively (i) ionic strength (i.e. chloride concentration, added as potassium chloride), (ii) sulphate concentration (added as sodium sulphate, in the presence of a low or high chloride concentration) and (iii) carbonate concentration (added as sodium carbonate). Example 4 is an evaluation of the compatibility of alumina-coated silica particles with the delayed gelation process.

EXAMPLE 1

Stability of Alumina-coated Colloidal Silica Particles and Delayed Gelling System as a Function of the Ionic Strength of the "Basefluid"

Figure 2:
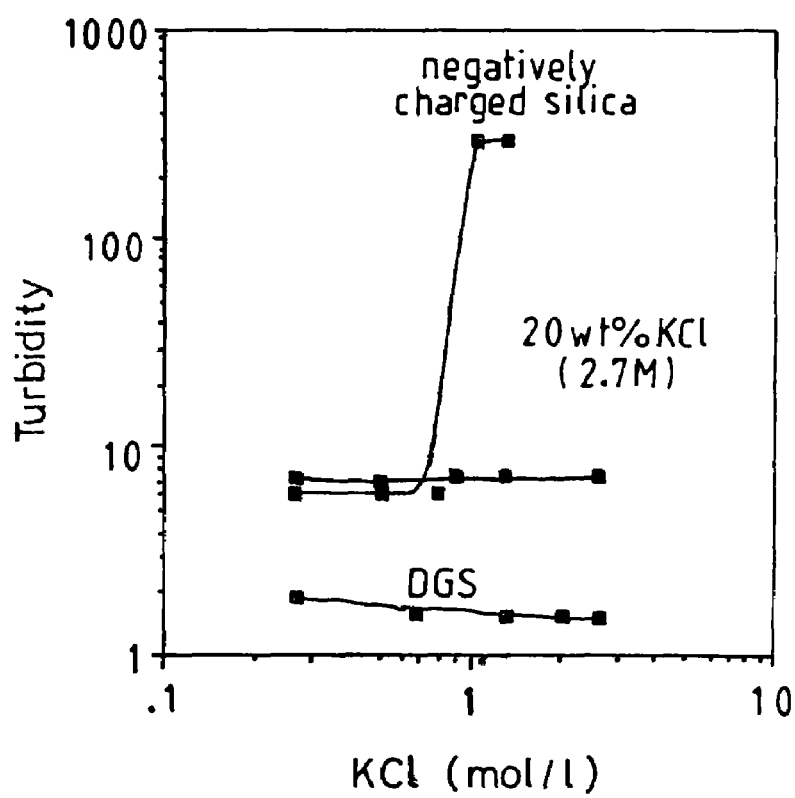
FIG. 2 is a graph showing the turbidities of aqueous solutions containing: (1) 0.1 vol % colloidal silica ("negatively charged silica"), (2) 0.1 vol % alumina-coated colloidal silica ("CL"), and (3) 4 wt % $Al_2OHCl_5.2.5H_2O$ ("DGS"—delayed gelling system) against concentration of potassium chloride (KCl) in the solutions.

FIG. 2 is a plot showing the effect of increasing the concentration of potassium chloride (KCl) in the basefluid on the turbidity of: (1) 0.1 vol % colloidal silica (Ludox SM, mean particle diameter 7 nm, negatively charged at pH 7), (2) 0.1 vol % alumina-coated colloidal silica (Ludox CL12, mean particle diameter 12 nm, positively charged at pH 5) and (3) the delayed gelling system ("DGS"; pre-gel solution containing 4 wt % $Al_2OHCl_5.2.5H_2O$, pH 4.5).

When $[KCl] \leq 0.8$ mol/L, both the negatively charged "SM" and the positively charged "CL" particles were stabilised resulting in a similar low level of turbidity. However, when $[KCl] \geq 0.8$ mol/L, "SM" particles were destabilised resulting in a highly turbid suspension. In contrast, "CL" particles were stable in the presence of at least 20 wt % (2.7 mol/L) KCl. The pre-gel DGS solution had a lower turbidity than 0.1 vol % CL and was also stable in 20 wt % KCl.

EXAMPLE 2

Figure 3:
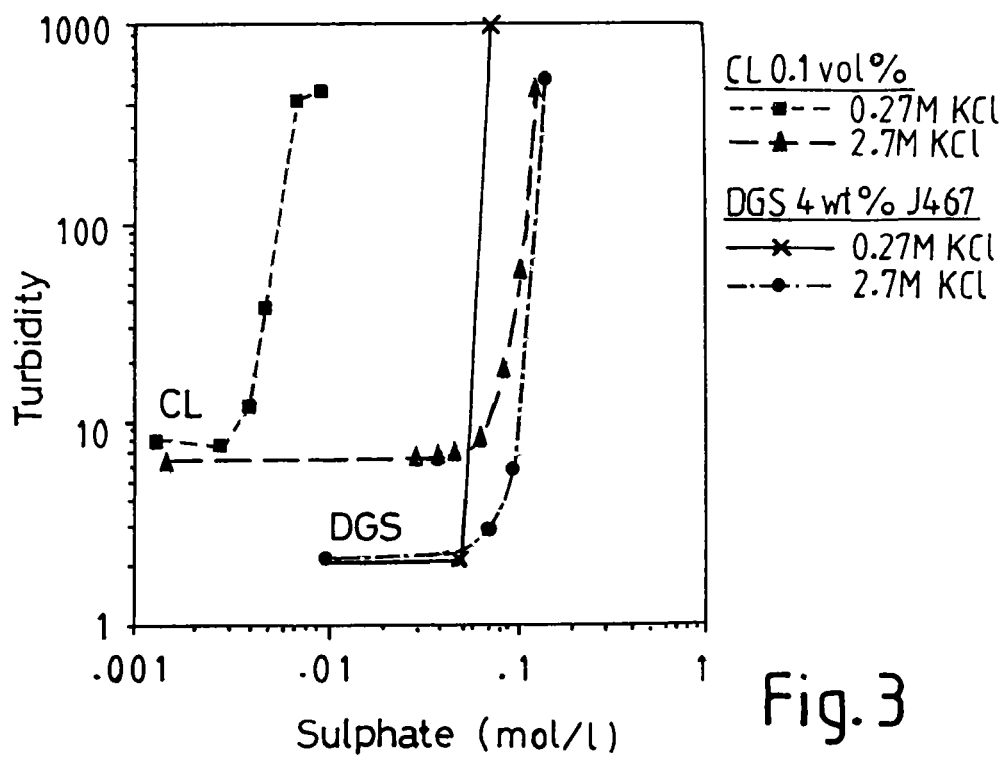
FIG. 3 is a graph showing the turbidities of 0.27 M and 2.7 M KCl aqueous solutions containing: (1) 0.1 vol % alumina-coated colloidal silica ("CL"), and (2) 4 wt % $Al_2OHCl_5.2.5H_2O$ ("DGS") against sulphate concentration in the solutions.

Stability of Alumina-coated Colloidal Silica Particles and Delayed Gelling System in the Presence of Sulphate Anions FIG. 3 is a plot showing the effect of sulphate concentration on the stability of Ludox CL12 particles and the delayed gelling system ("DGS"; pre-gel solution containing 4 wt % $Al_2OHCl_5.2.5H_2O$, pH 4.5) both in the presence of a low (0.27 mol/L) and a high (2.7 mol/L) concentration of potassium chloride. In 0.27 mol/L KCl, the Ludox CL12 particle suspension and the pre-gel "DGS" solution became highly turbid when the molar ratio $[SO_4^{2-}]/[Cl^-]$ reached 0.019 and 0.22, respectively. In 2.7 mol/L KCl, both Ludox CL12 and DGS were stable in the presence of up to 0.1 mol/L $SO_4^{2-}$, corresponding to the molar ratio $[SO_4^{2-}]/[Cl^-]=0.037$. These data suggest that the particle/fluid system is compatible with typical formation brines for which the distribution of molar ratios $[SO_4^{2-}]/[Cl^-]$ is <0.013 (H. Blatt ibid.). The data also suggest that the addition of a chloride salt may be required to stabilise the particles and DGS in seawater (molar ratio $[SO_4^{2-}]/[Cl^-]=0.052$, H. Blatt ibid.).

EXAMPLE 3

Figure 4:
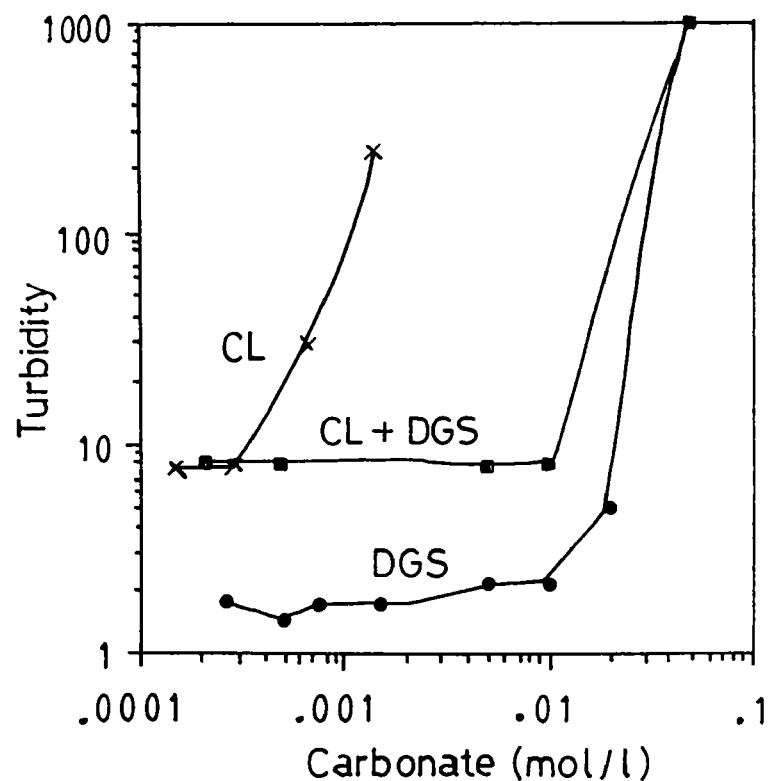
FIG. 4 is a graph showing the turbidities of 2.7 M KCl aqueous solutions containing: (1) 0.1 vol % alumina-coated colloidal silica ("CL"), (2) 4 wt % $Al_2OHCl_5.2.5H_2O$ ("DGS"), and (3) 0.1 vol % alumina-coated colloidal silica and 4 wt % $Al_2OHCl_5.2.5H_2O$ ("CL+DGS") against carbonate concentration in the solutions.

Stability of Alumina-coated Colloidal Silica Particles and Delayed Gelling System in the Presence of Carbonate Anions FIG. 4 is a plot showing the effect of carbonate concentration on the stability of Ludox CL12 particles alone, "DGS" alone (pre-gel solution containing 4 wt % $Al_2OHCl_5.2.5H_2O$, pH 4.5) and the combined CL/DGS system in the presence of a high (2.7 mol/L) concentration of potassium chloride. In the absence of DGS, Ludox CL12 particles flocculated in the presence of only 0.0015 mol/L carbonate which raised the pH to ≈7 (at this pH, $CO_3^{2-}$ converts to $HCO_3^-$). However, in the presence of DGS, the particles tolerated the presence of 0.02 mol/L carbonate. The DGS acted a buffer maintaining acidic conditions in which $HCO_3^-$ is converted to $H_2CO_3$. The buffering capacity of the DGS system will increase with the gelant ($Al_2OHCl_5.2.5H_2O$) concentration in the formulation.

EXAMPLE 4

Compatibility of Alumina-coated Silica Particles with Delayed Gelation Process

Figure 5:
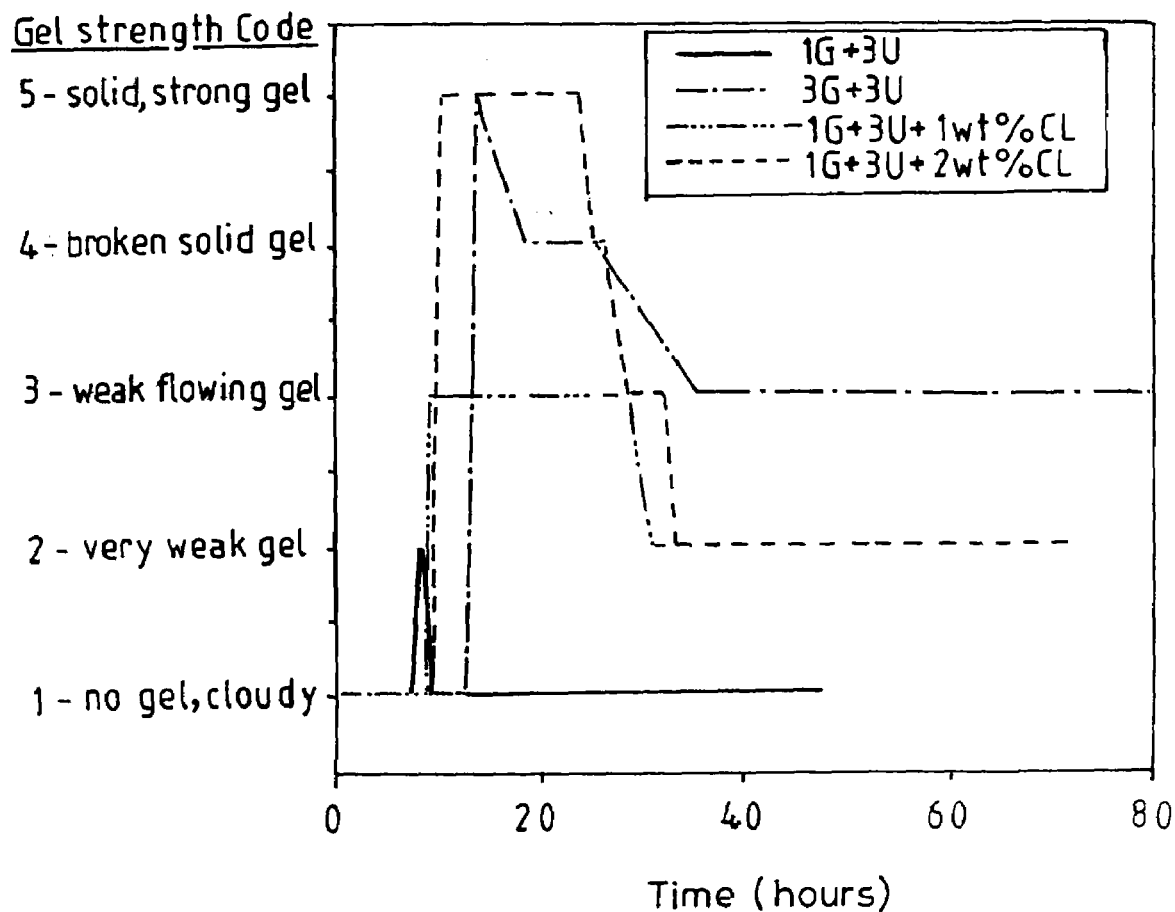
FIG. 5 is a graph showing the gel strengths against time of aqueous solutions containing: (1) 1 wt % $Al_2OHCl_5.2.5H_2O$ and 3 wt % urea ("1G+3U"), (2) 3 wt % $Al_2OHCl_5.2.5H_2O$ and 3 wt % urea ("3G+3U"), (3) 1 wt % $Al_2OHCl_5.2.5H_2O$, 3 wt % urea and 1 wt % alumina-coated colloidal silica ("1G+3U+1 wt % CL"), and (4) 1 wt % $Al_2OHCl_5.2.5H_2O$, 3 wt % urea and 2 wt % alumina-coated colloidal silica ("1G+3U+2 wt % CL"), each solution also containing 2 wt % KCl and being maintained at 75° C.

FIG. 5 shows the effect of partially replacing the gelant, $Al_2OHCl_5.2.5H_2O$ ("G"), with Ludox CL12 particles ("CL") in terms of the observed delayed gel time and the gel strength/stability. The following series of gel strength codes was used to give a semi-quantitative estimation of gel strength and stability as a function of time:

Code 5: strong solid gel—space-filling solid white gel which does not deform/break when inclined or inverted.
Code 4: broken solid gel—gel fractures into a few solid white gel pieces when inclined or inverted and develops free water.
Code 3: weak flowing gel—pieces of gel are intimately mixed with free water to give a weak gel which flows when inclined.
Code 2: very weak gel—weak flowing gel which degrades to a slightly viscous milky suspension of gel aggregates.
Code 1: no gel—pre-gel solution (clear, water-like solution) or fully degraded gel (turbid suspension of precipitate).

In this comparison, the activator is urea ("U" present at 3 wt %), the basefluid is 2 wt % KCl and the temperature of the formulations was maintained at 75° C. When [G]=1 wt % and [U]=3 wt %, the addition of 1 or 2 wt % Ludox CL12 resulted in a slight increase in the gel time from 8 to 10 hours but the main effect was to increase the gel strength and stability of the gel. The gel composed of 1 wt % G+2 wt % CL was visibly stronger and more stable than the gel formed from 3 wt % G.

Figure 6:
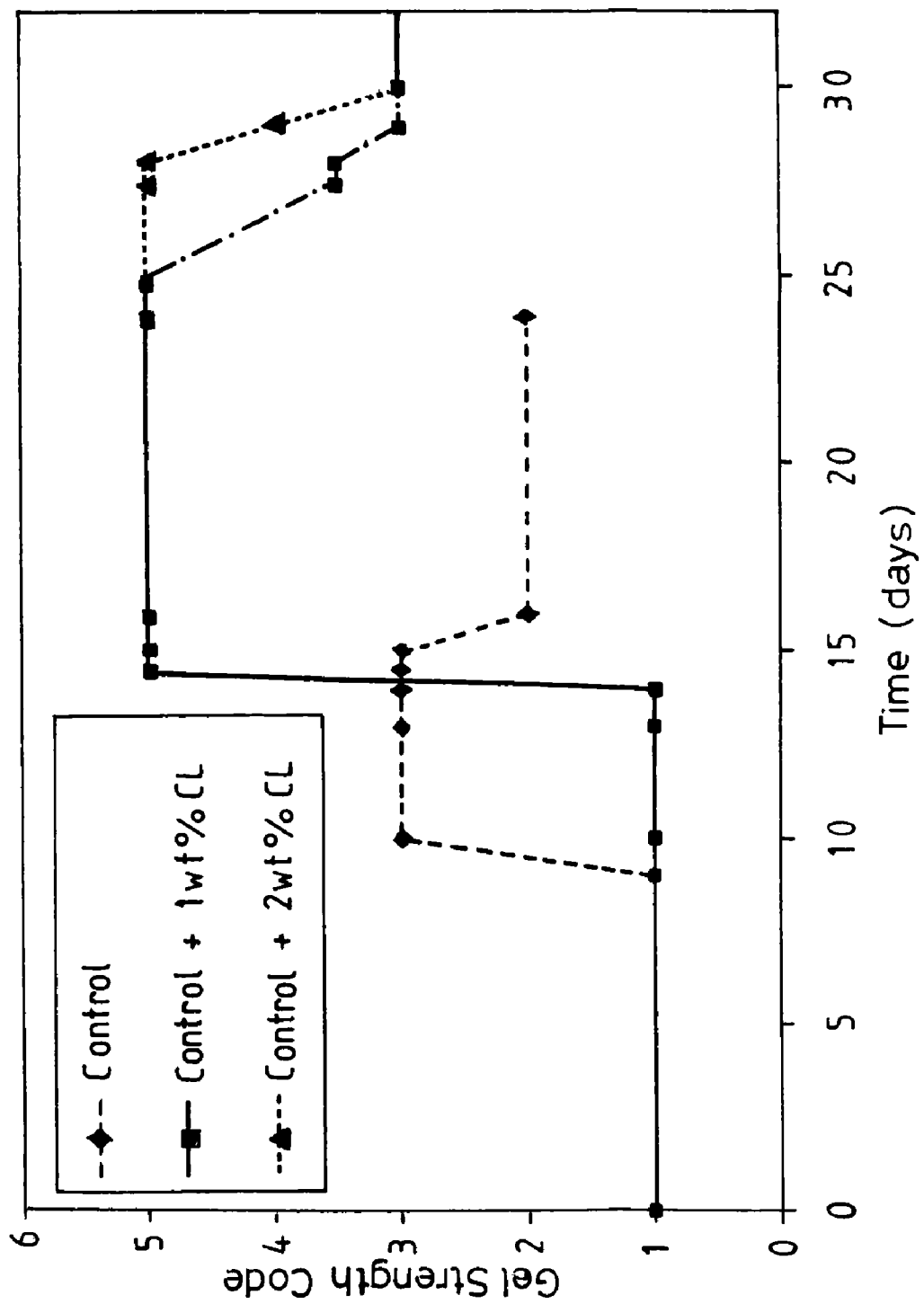
FIG. 6 is a graph showing the gel strengths against time of aqueous solutions containing: (1) 3 wt % $Al_2OHCl_5.2.5H_2O$ and 1 wt % 1,3-dimethyl urea ("Control"), (2) 3 wt % $Al_2OHCl_5.2.5H_2O$, 1 wt % 1,3-dimethyl urea and 1 wt % alumina-coated colloidal silica ("Control+1 wt % CL"), and (3) 3 wt % $Al_2OHCl_5.2.5H_2O$, 1 wt % 1,3-dimethyl urea and 2 wt % alumina-coated colloidal silica ("Control+2 wt % CL"), each solution also containing 2 wt % KCl and being maintained at 90° C.

FIG. 6 shows the effect of adding 1 or 2 wt % Ludox CL12 particles to a different DGS formulation containing 3 wt % gelant and the higher temperature activator, 1,3-dimethyl urea ("DMU" present at 1 wt %). In this comparison, the basefluid is 2 wt % KCl and the temperature of the formulations was maintained at 90° C. Again, the presence of the Ludox CL12 particles resulted in a more highly delayed gelation but the main effect was to strengthen the gel and to improve its stability.

Placement Selectivity

A uniaxial coreflood rig was used to evaluate the efficiency of using the alumina-coated colloidal silica particles to improve placement selectivity. The rig accommodates a cylindrical rock core 8 cm in length and 5.05 cm in diameter. A constant pressure gradient was applied to pump the test fluid through the core to a weighed core effluent receiver vessel. High frequency measurements of the effluent flow rate were used to monitor the permeability of the core as a function of time. A differential pressure gradient of 60 psi/8 cm (229 psi/foot or 413.7 kPa/8 cm) was used in all the coreflood experiments; this is equivalent to the near-wellbore pressure gradient given by the injection of a fluid with Newtonian viscosity, $\eta=1$ mPa·s, into a 5 feet (1.52 m) thick horizontal layer of permeability 500 mD and porosity 15%. Each core was vacuum saturated with brine (2 wt % KCl) overnight before loading it into the rig. The core was then pre-flushed with >100 pore volumes of 2 wt % KCl brine in order to determine the steady-state brine permeability of the core before introducing the test fluid.

Figure 7:
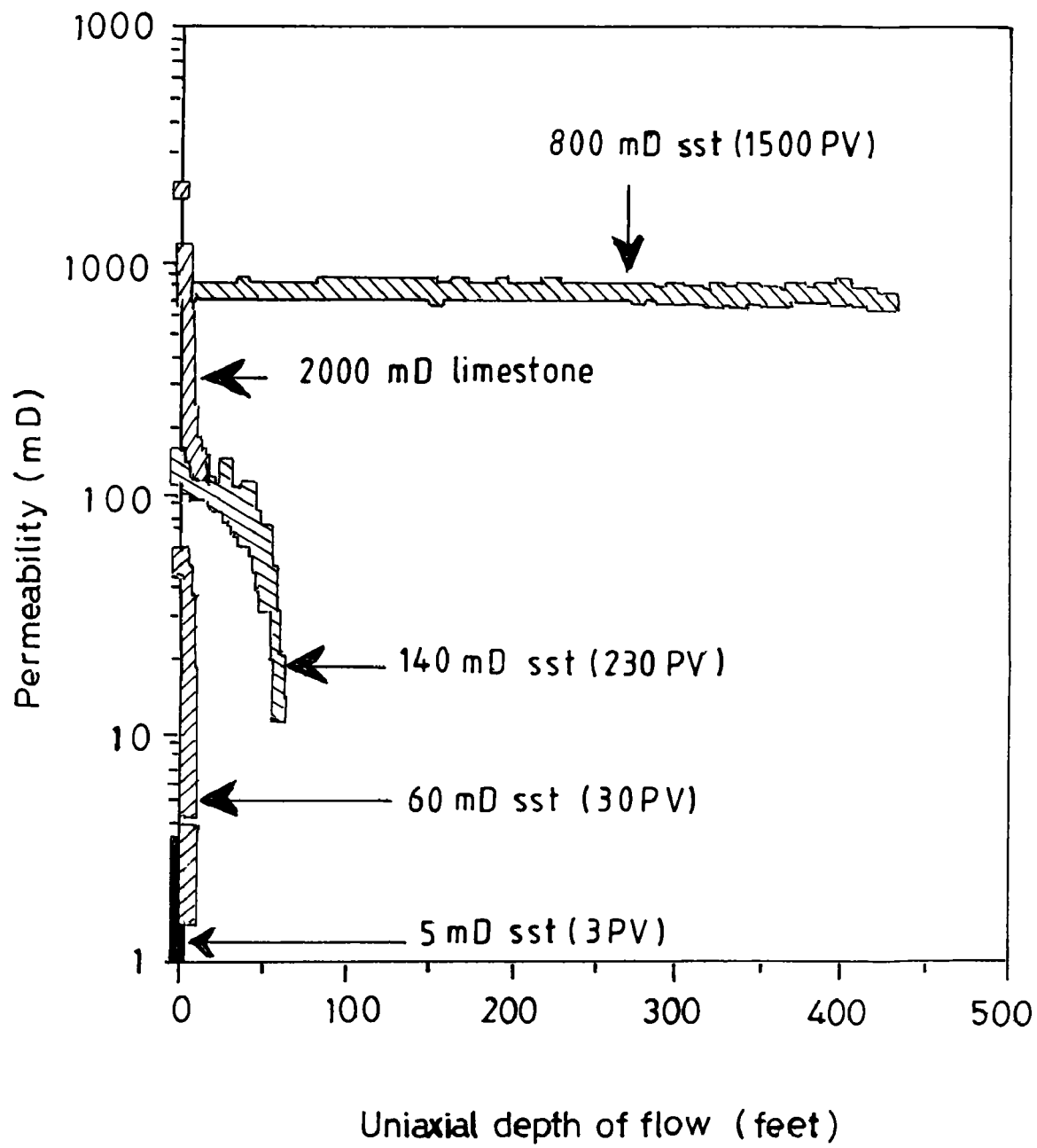
FIG. 7 is a graph showing permeability against uniaxial depth of flow for coreflood experiments on four sandstone cores (starting permeabilities 5, 60, 140 and 800 mD) and one limestone core (starting permeability 2000 mD), the "PV" value associated with each core being the number of pore volumes of test fluid pumped through the core by the end of the respective coreflood experiment.

FIG. 7 compares changes in the permeability (mD) of several different sandstone cores and one oolitic limestone core as a function of the uniaxial depth of flow (feet) when the test fluid was 0.1 vol % Ludox CL12 suspended in 2 wt % KCl brine. The brine permeability of the sandstones varied from 5 mD to 800 mD. Uniaxial (or linear) depth of flow (feet)=(no. pore volumes injected)×8 cm/30.48 cm/ft. Referring to FIG. 7, the uniaxial depth of flow 400 feet corresponds to 1524 pore volumes (PV) injected. For example, at the uniaxial depth of flow 400 feet, the total volume of test fluid pumped through the 800 mD sandstone (porosity=0.22) was (1524 PV)×35.25 cm$^3$/PV=53721 cm$^3$.

The data show that a very high number of pore volumes of the 0.1 vol % CL suspension can be injected into the 800 mD sandstone without any significant reduction in the permeability. In contrast, the same suspension caused a gradual blocking of the sandstones with initial permeability k<140 mD. It is also evident that the number of pore volumes of the suspension required to significantly reduce the permeability of these sandstones decreased with the initial brine permeability of the core. For example, the 140 mD sandstone became blocked after 230 pore volumes and the 5 mD sandstone became blocked after only 3 pore volumes. The data indicate that the suspension could be selectively placed in the higher permeability (k=800 mD) sandstone as the particles would limit flow into adjacent lower permeability (k<140 mD) sandstone layers/zones.

We also note from FIG. 7 that the same suspension caused a rapid reduction in the permeability of the high permeability limestone core. This effect is caused by a rapid destabilisation (flocculation) of the Ludox CL12 particles due to their interaction with dissolved bicarbonate/carbonate ions in the pore fluid of the limestone core. This is consistent with the observation that, in the absence of gelant, the particles flocculate in the presence of 0.0015 mol/L carbonate (see Example 3, FIG. 4). However, when the same particles are suspended in the delayed gelling system, they become protected and are stable in the presence of 0.02 mol/L bicarbonate/carbonate. Even in the absence of gelant, when the pH of the suspension is adjusted to 3, the particles are stable in the presence of at least 0.15 mol/L bicarbonate/carbonate (the latter being rapidly converted to the form carbonic acid, $H_2CO_3$).

Figure 8:
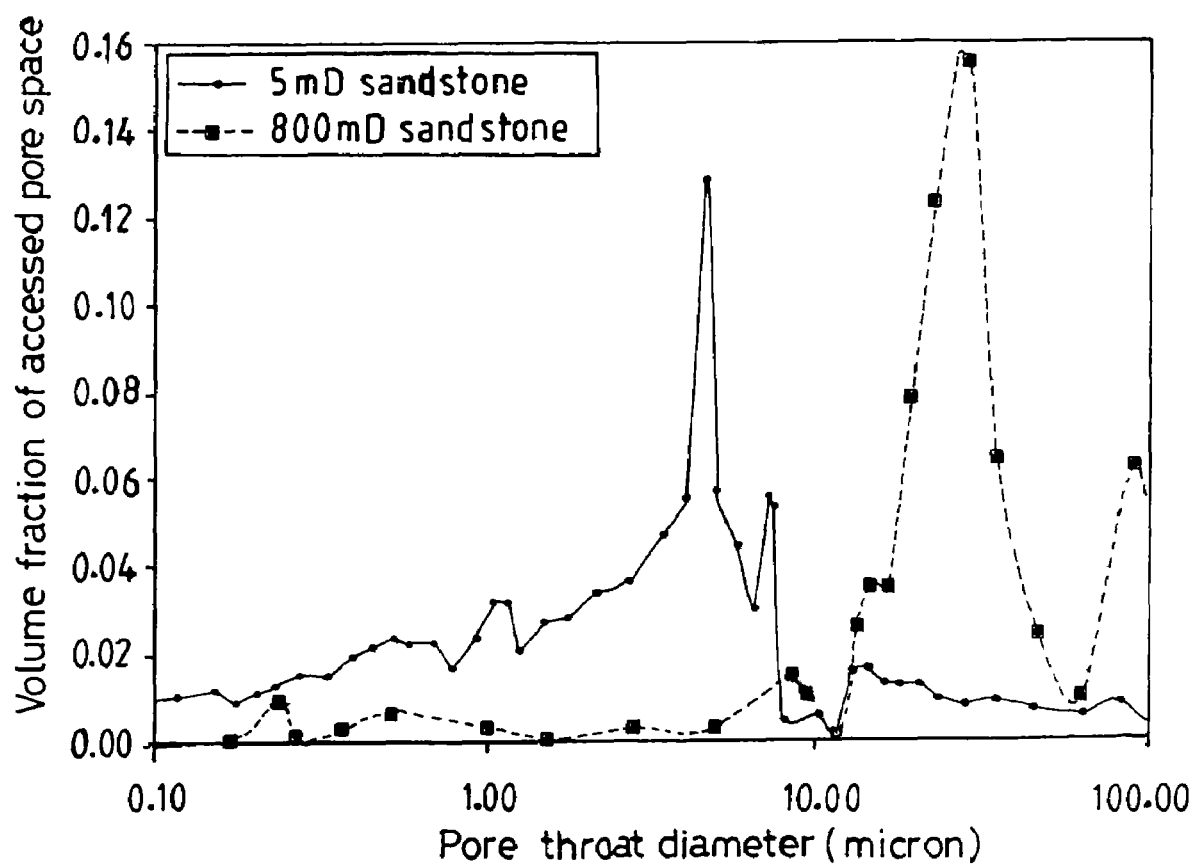
FIG. 8 is a graph showing the pore throat diameter distributions determined by mercury porosimetry of the 5 mD and 800 mD sandstones used in the experiments of FIG. 7.

FIG. 8 compares the pore throat diameter distributions (as determined by mercury porosimetry) of the 5 mD and 800 mD sandstones used in the coreflood experiments. The pore throat diameter distribution of the lower permeability sandstone indicates a peak at 4.69 μm, with the median (cumulative vol %=50) at 2.64 μm, and 87 vol % of the accessed pore volume containing pore throats with a diameter in the range 0.01-10 μm (i.e. 10-10000 nm, compared to the nominal Ludox CL12 particle diameter 12 nm). In contrast, the data for the higher permeability sandstone indicate a peak at 28.1 μm, with the median at 26.6 μm and 83.3 vol % of the accessed pore volume containing pore throats with a diameter in the range 10-100 μm (10000-100000 nm).

The data shown in FIG. 7 suggest that the particles reduce the permeability of the lower permeability (k<140 mD) sandstones by a process which involves the gradual retention of particles and multi-particle aggregates. As the flood progresses, we believe that an increasing volume of particles is retained and that the presence of the retained particles and multi-particle aggregates results in an increased resistance to flow through pore throats. This hypothesis is consistent with the observed trend that the number of pore volumes of the suspension (or the total volume of particles) required to block the permeability of the lower permeability sandstones decreases with a decrease in the initial brine permeability (or a decrease in the diameter of the predominant pore throats).

Figure 9:
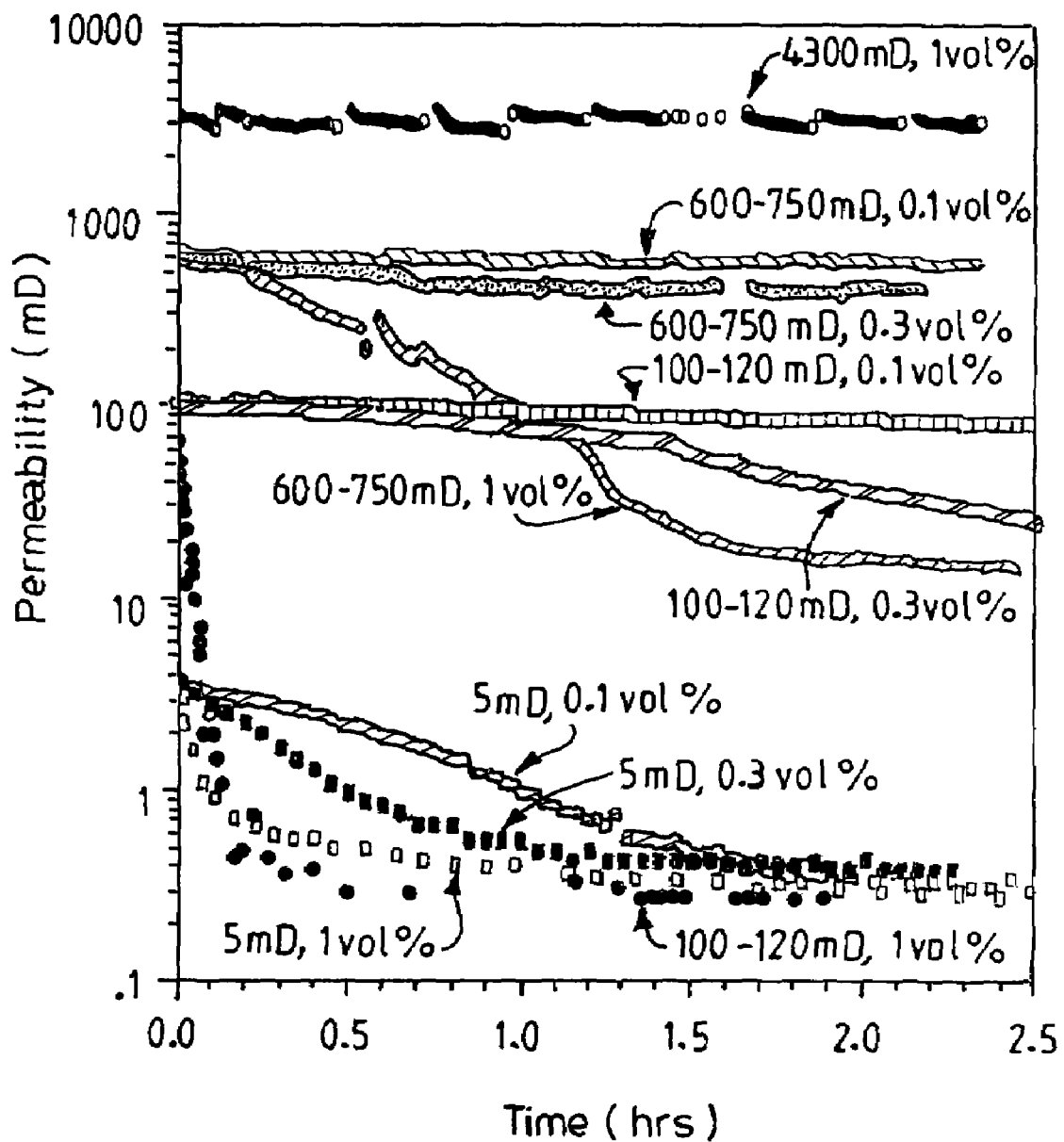
FIG. 9 is a graph showing permeability against time for coreflood experiments on three sandstone cores (starting permeabilities 5, 100-120 and 600-750 mD) and a core of packed sized sand grains (starting permeability 4300 mD), the coreflood test fluids being 2 wt % KCl brines containing 0.1, 0.3 or 1 vol % Ludox CL12 particles.

It follows from this that, for a given initial brine permeability, the number of pore volumes of the suspension required for blocking should decrease with an increase in the concentration of particles in the suspension. Indeed, as shown in FIG. 9, this behaviour is observed for suspensions of Ludox CL12, again in 2 wt % KCl brine. In FIG. 9, we include the results of a coreflood where the porous media is a high permeability (4300 mD) pack of sized sand grains; this sandpack models a very high permeability sandstone layer the permeability of which is not impaired by the injection of multiple pore volumes of a suspension containing 1 vol % Ludox CL12 particles. The data show that the number of pore volumes of the suspension (or the time) required to reduce the permeability of the 600-750 mD, 100-120 mD or 5 mD sandstones decreases with an increasing concentration of particles in the suspension.

The data shown in FIGS. 7-9 indicate that the particle suspension approach can be used to improve placement selectivity for the injection of a treatment fluid into a multi-layered reservoir where the objective is to increase the proportion of the fluid which invades the higher permeability layers/zones. The efficiency with which the suspension can improve the placement selectivity of such a treatment depends on the concentration and size of the particles in suspension and the permeability of the target and non-target zones. Both the permeability contrast, $k_{(target)}/k_{(non-target)}$, and the absolute permeability of the target zone are important inputs in the treatment design.

The particles may be used to divert the fluid "in-wellbore", i.e. due to a contrast in the horizontal permeability of the layers.

Figure 10:
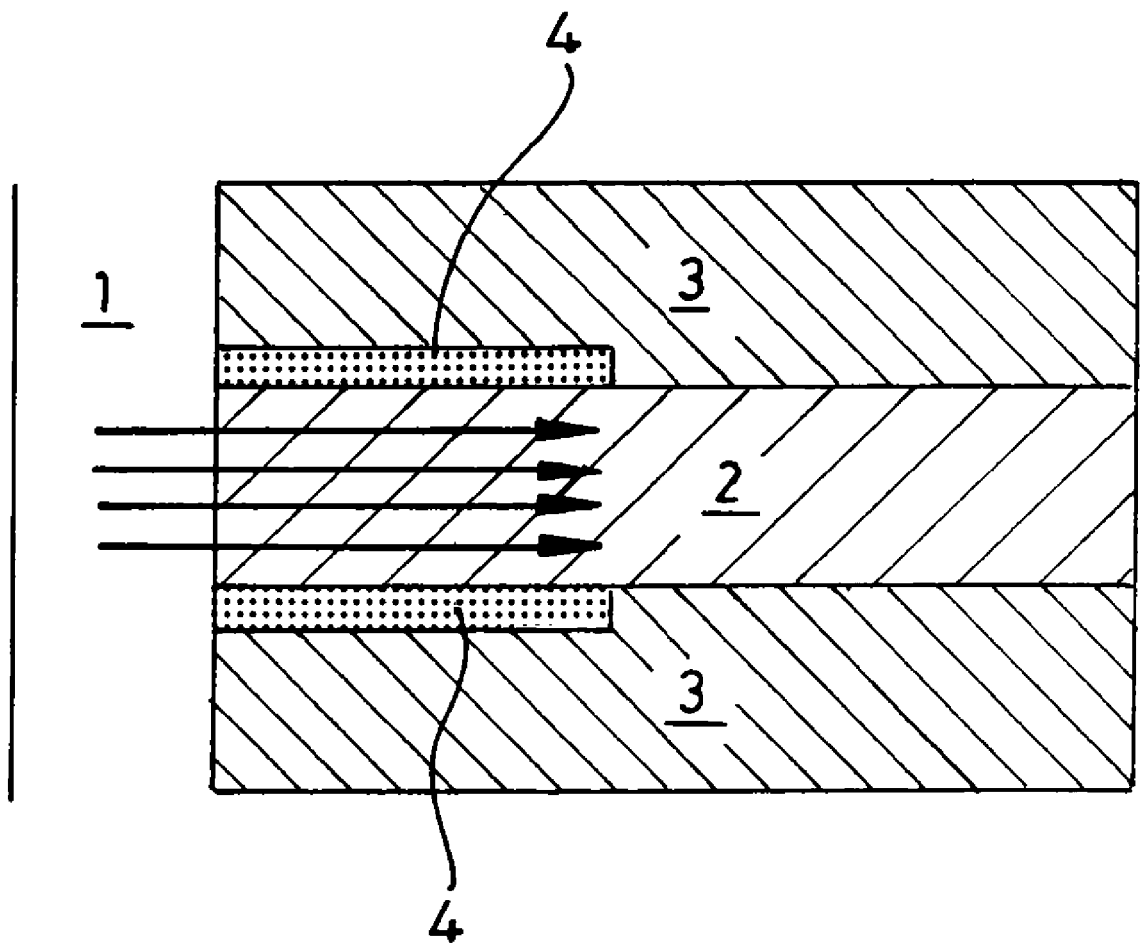
FIG. 10 shows schematically cross flow barrier formation between high and low permeability layers.

However, they may also form "crossflow barriers", as illustrated in FIG. 10. This shows schematically a well bore 1 penetrating a high permeability layer 2 sandwiched between lower permeability layers 3. During placement, the particles are carried by the fluid flow (indicated by the arrows) into the high permeability layer and accumulate to form crossflow barriers 4 in the lower permeability layers at the layer interfaces. These barriers reduce the flow of treatment fluid into the low permeability layers. In this case, the significant permeability contrast is $k_{h(target)}/k_{v(non-target)}$, where the subscripts h and v are respectively the horizontal and vertical directions.

Enhancement of Gel Strength and Stability

Boehmite needles of various aspect ratios were synthesised according to the procedure of P. A. Buining, Y. S. J. Veldhuizen, C. Pathmamanoharan and H. N. W. Lekkerkerker, *Colloids and Surfaces*, 64, 47 (1992). Aluminum-iso-propoxide (AIP, 98%, Janssen chemica) and aluminum-sec-butoxide (ASB, Fluka chemica) were dissolved in water which had been acidified with hydrochloric acid (37%, Merck). The quantities of the reagents used to prepare two boehmites, designated "BM1" and "BM2", are given in Table 1.

After one week of hydrolysis, the polymerised aluminum hydroxides were crystallised into boehmite under hydrothermal conditions (150° C., 4 atm.). Dialysing thoroughly against flowing demineralised water resulted in a permanent birefringent, viscous dispersion of boehmite needles. After dialysis, the solid content of the boehmite dispersions was typically around 10 g/L (equivalent to ≈0.3 vol %). After vacuum drying the BM1 dispersion, an elemental analysis of the residue revealed 43.3 wt % Al, 52.1 wt % O and 1.95 wt % H which compares well with the relative amounts of Al, O and H in pure boehmite (AlOOH: 45.0 wt % Al, 53.3 wt % O and 1.7 wt % H).

Figure 11:
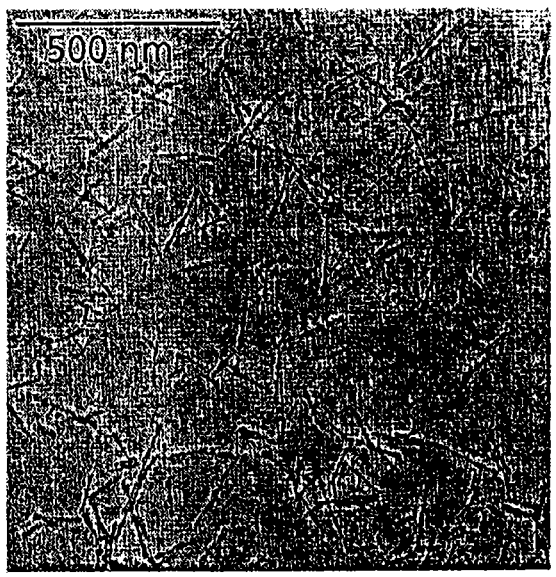
FIG. 11 shows a transmission electron micrograph of the boehmite rods of preparation BM1.
Figure 12:
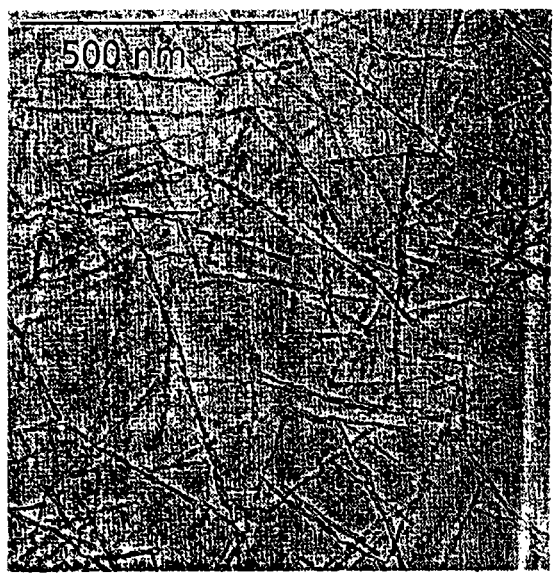
FIG. 12 shows a transmission electron micrograph of the boehmite rods of preparation BM2.

Transmission electron micrographs of the boehmite rods in preparations BM1 and BM2 are respectively shown in FIGS. 11 and 12. The boehmite rods in BM1 have an average length 90 nm and width 10 nm. The longer boehmite rods in BM2 have an average length 180 nm and width 10 nm.

TABLE 1

Synthesis details and dimensions of boehmites BM1 and BM2

| System | [HCl] mol/L | [ASB] mol/L | [AIP] mol/L | Mean length (nm) | Relative standard deviation length (%) | Mean width (nm) | Relative standard deviation width (%) |
|---|---|---|---|---|---|---|---|
| BM1 | 0.04 | 0.2 | — | 91 | 29 | 10.8 | 34 |
| BM2 | 0.09 | 0.08 | 0.08 | 180 | 30 | 10 | 30 |

The boehmite suspensions were kinetically stable at room temperature and 1 atm. In water at neutral pH, the boehmite needles carry a positive charge and are charge stabilised, as long as the ionic strength is <0.01 mol/L. As shown in the examples, the chemistry and charge on the surface of the boehmite rods is compatible with delayed inorganic gelling systems based on the controlled hydrolysis of an aqueous solution of a simple aluminum halide salt such as aluminum chloride or a basic aluminum halide salt such as an aluminum chlorohydrate, $Al_2(OH)_mCl_n$, where, typically, m is in the range 4 to 5, n is in the range 1 to 2 and (m+n)=6.

Silica-coated boehmite rods are the preferred choice for enhancing the strength and stability of a delayed silicate gel. This is because, in general, the rods should be chemically compatible with (i) the pre-gel solution so that the particle suspension is stable during fluid placement and (ii) the final gel so that adverse effects on gel time are minimised. Boehmite needles can be coated with a thin layer of silica according to a method developed by Philipse et al. (see A. P. Philipse, A. Nechifor and C. Pathmamanoharan, *Langmuir*, 10, 4451 (1994)). A dialysed boehmite dispersion was titrated with an aqueous solution of sodium silicate. For rods with large (>10) aspect ratios, the concentration of the boehmite dispersion should not be >1 g/L, whereas for aspect ratios <10, the concentration should not be higher than 5 g/L.

Before starting the titration, a 3 wt % sodium silicate solution ($Na_2Si_3O_7$, Fluka chemica) was mixed with purified cation exchange resin (Dowex 50 W×4), changing $Na^+$ into $H^+$, causing a pH drop from 12 to 11. The exchanged sodium silicate solution was added to 1 liter of the rod dispersion of pH 5.5 with a peristaltic pump under vigorous stirring and ultrasonication, preventing aggregation of the rods in the first stage of the coating procedure. Aggregation was induced by a decrease of the surface potential as the isoelectric point (IEP) of boehmite at pH ≈9 was approached upon titrating with the alkaline waterglass solution. In order to pass the IEP quickly, the sodium silicate solution was rapidly added with a rate of 10 mL/min during the first 8 minutes. After 8 minutes, the addition rate of waterglass was adjusted to 8.5 mL/min. After another 8 minutes, the addition rate was reduced to 4 mL/min. After 30 minutes, sonication was stopped. At a pH of 9.5-10, small portions of the cation exchange resin were added to keep the pH constant, as a further increase of the pH would ultimately lead to dissolution of the silica coating at pH>11.5. After a total of 30 minutes from the beginning of the addition of the waterglass, the waterglass addition rate was adjusted to 1 mL/min. In total, 500 mL of 3 wt % sodium silicate solution was added to the dispersion, irrespective of the initial boehmite concentration.

The dispersion was then dialysed against streaming demineralised water for 9 days to remove the non-precipitated silicates. After dialysis, the pH had dropped from 10 to 5.5 and, due to the lower solubility of silica at pH 5.5, all excess silica precipitated in bulk. These large silica aggregates were removed by centrifugation at 2500 rpm. The resulting blue-white scattering dispersions showed streaming birefringence and had solid contents of around 1 g/L.

Two different delayed-gelation systems were generated using respectively non-coated and coated boehmite rods. The results show that the presence of particles, and particularly elongate particles, in delayed-gelation solutions can enhance gel strength and stability with an efficiency which can be higher than that achievable by the addition of an equivalent weight of extra gelant.

System 1: Non-coated Rod-shaped Particles

Non-coated BM1 and BM2 boehmite rods were suspended in delayed-gelation systems based on the controlled hydrolysis of aluminum species starting from an aqueous solution of aluminum chloride and/or aluminum chlorohydrate, $Al_2(OH)_mCl_n$, where m is in the range 4 to 5, n is in the range 1 to 2 and (m+n)=6. For these systems, the efficiency with which the boehmite rods enhanced gel strength and stability was compared to that of an equivalent dosage of CL spherical alumina-coated colloidal silica particles (more specifically, Ludox CL12 particles).

Figure 13:
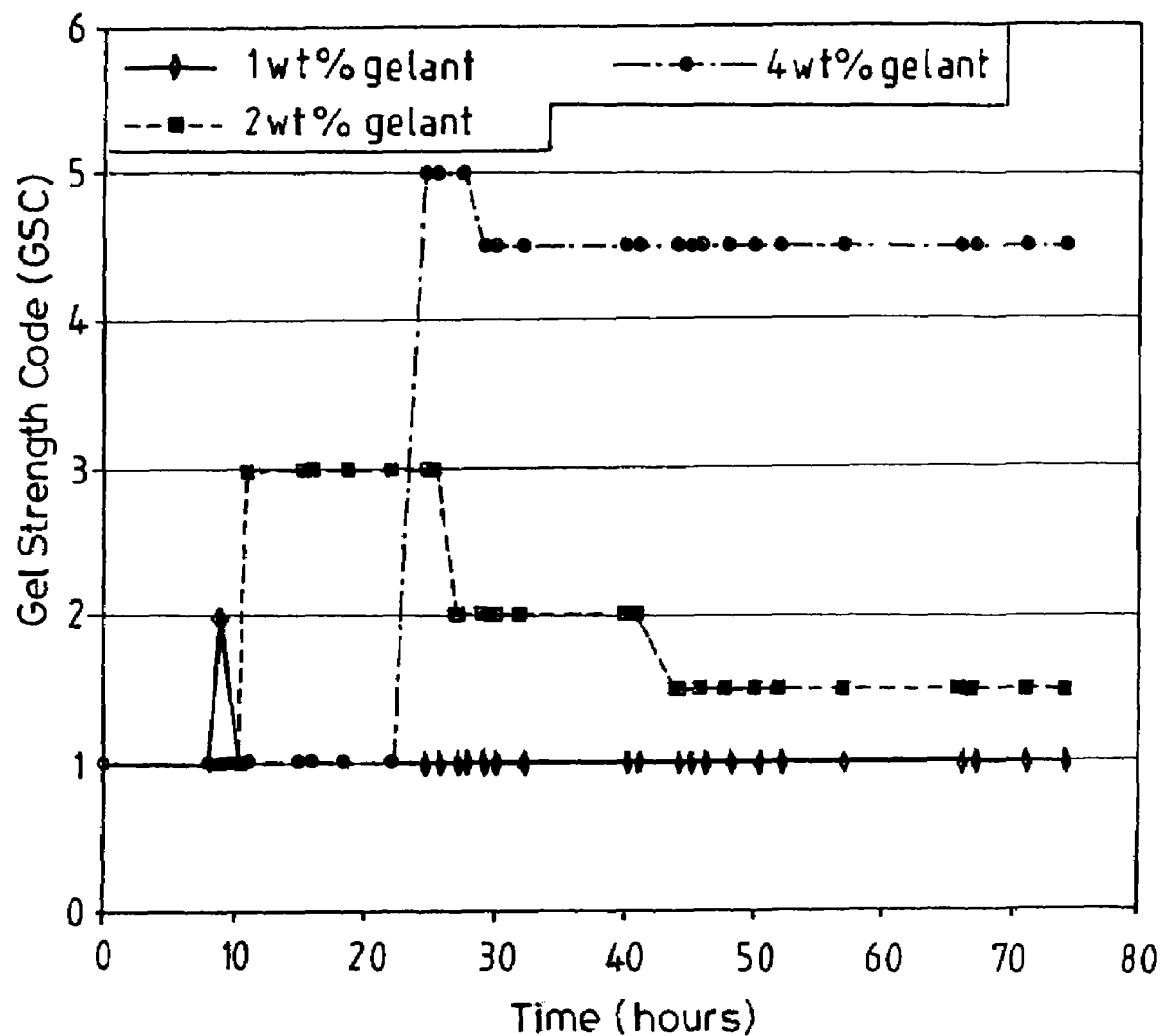
FIG. 13 shows a graph of gel strength code against ageing time at 71° C. for three comparative example solutions.

FIG. 13 shows the effect of increasing the gelant concentration, $[Al_2(OH)_5Cl.2.5H_2O]$ on the gel times and the strengths and stabilities of gels containing 1, 2 or 4 wt % gelant. In all cases, the pre-gel solutions contained 2 wt % potassium chloride and urea activator was present at a concentration of 3 wt %. The gels were developed by ageing the pre-gel solutions at a constant temperature of 71° C. No boehmite rods were present in these comparative examples.

When the concentration of gelant was 1 wt %, a very weak gel (code 2) formed after 9 hours but one hour later the gel had degraded to a turbid suspension which had a similar viscosity to the pre-gel solution. In contrast, when the gelant concentration was 4 wt %, a strong solid gel (code 5) formed after 24 hours. Subsequently, during the period 24-74 hours, the gel expelled water but the strength of the gel phase was maintained.

Figure 14:
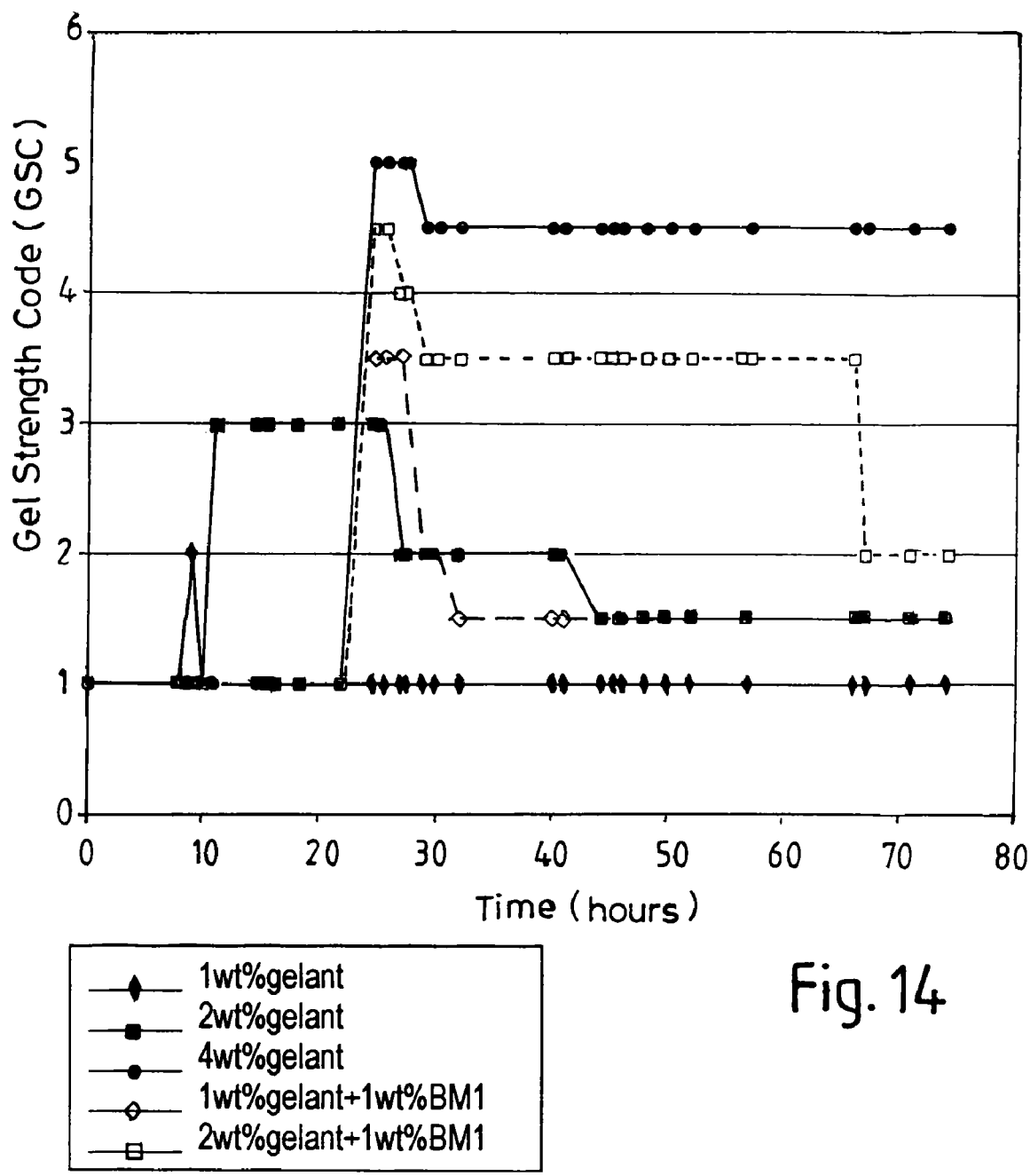
FIG. 14 shows the graph of FIG. 13 superimposed with the results for two solutions containing BM1 boehmite rods and also aged at 71° C.
Figure 15:
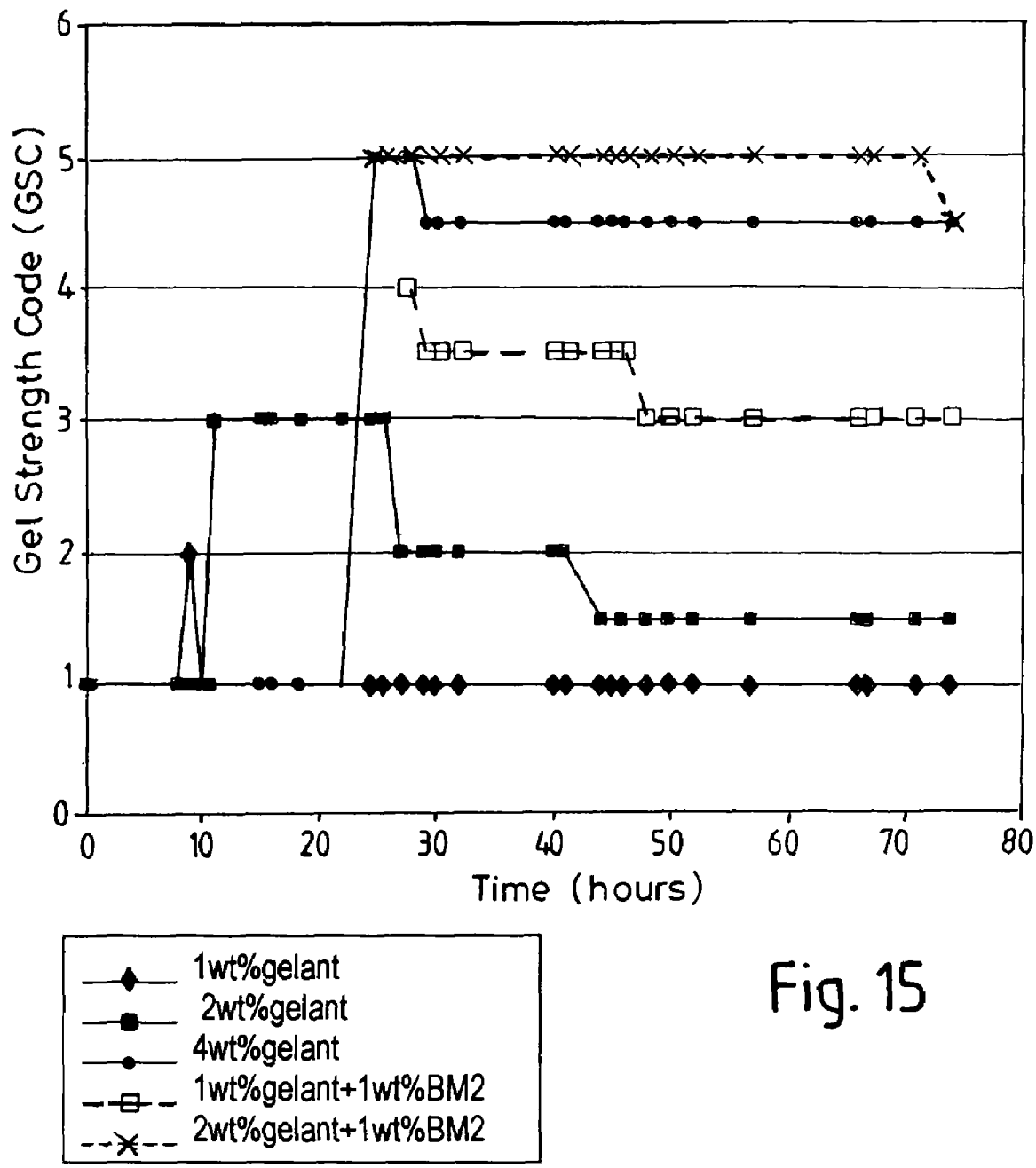
FIG. 15 shows the graph of FIG. 13 superimposed with the results for two solutions containing BM2 boehmite rods and also aged at 71° C.
Figure 16:
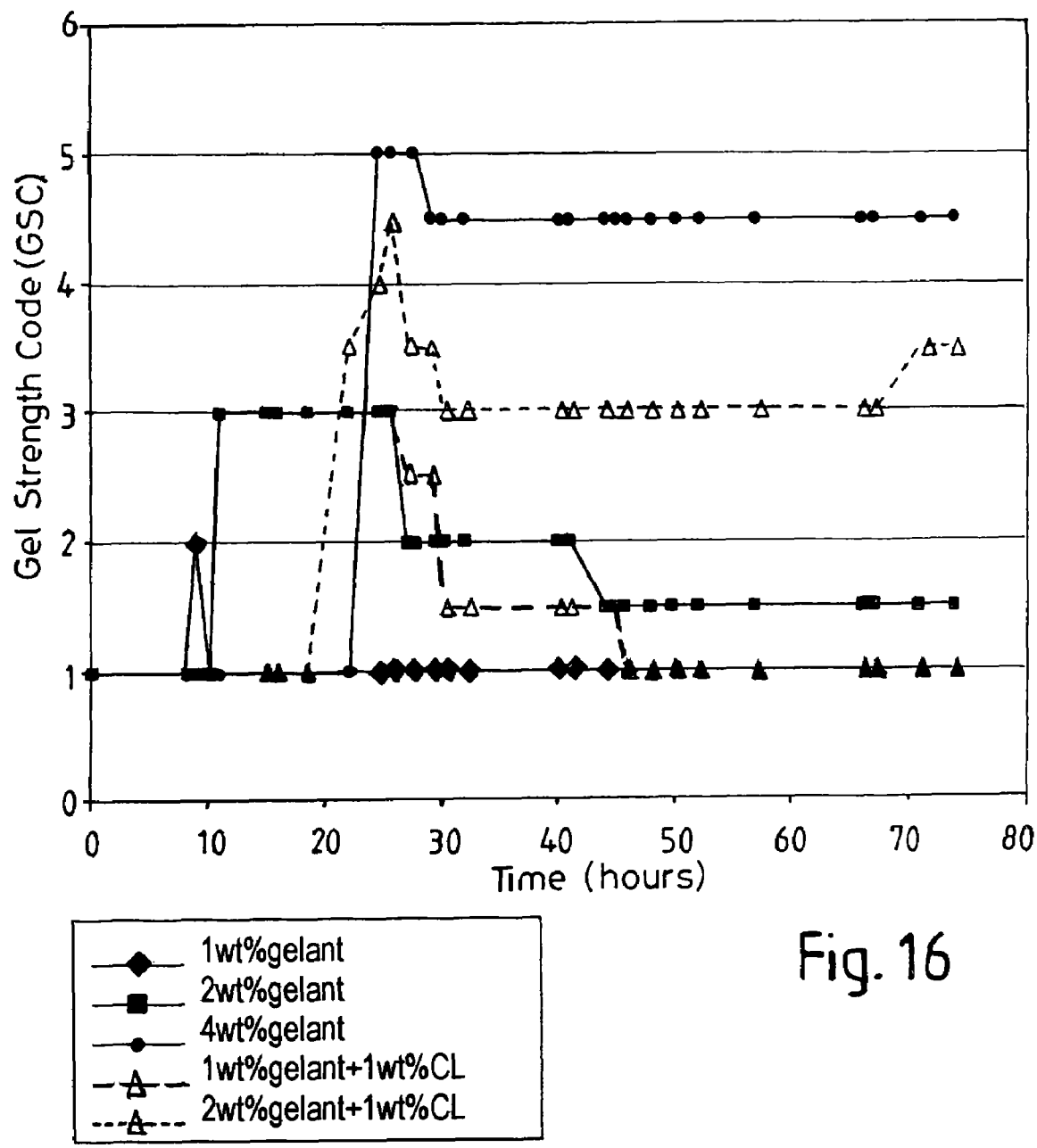
FIG. 16 shows the graph of FIG. 13 superimposed with the results for two solutions containing CL coated silica particles and also aged at 71° C.

The effects of adding the shorter boehmite rods (BM1), the longer boehmite rods (BM2) and the spherical alumina-coated colloidal silica particles (CL) on the strengths and stabilities of the solutions containing 1 and 2 wt % gelant are respectively shown in FIGS. 14, 15 and 16. Again, all the test solutions contained 2 wt % potassium chloride and 3 wt % urea, and all were aged at a constant temperature of 71° C. The test results indicate that the efficiency with which the different particles enhance gel strength and stability decreases in the following order:

| BM2 (longer rods) >> | BM1 (shorter rods) > | CL (spheres) |
|---|---|---|
| Higher efficiency | | Lower Efficiency |

In terms of gel strength codes versus time, the gel formed by the system with 2 wt % gelant and 1 wt % BM2 was at least as strong and stable as the gel formed by the system containing 4 wt % gelant and no added particles.

Figure 17:
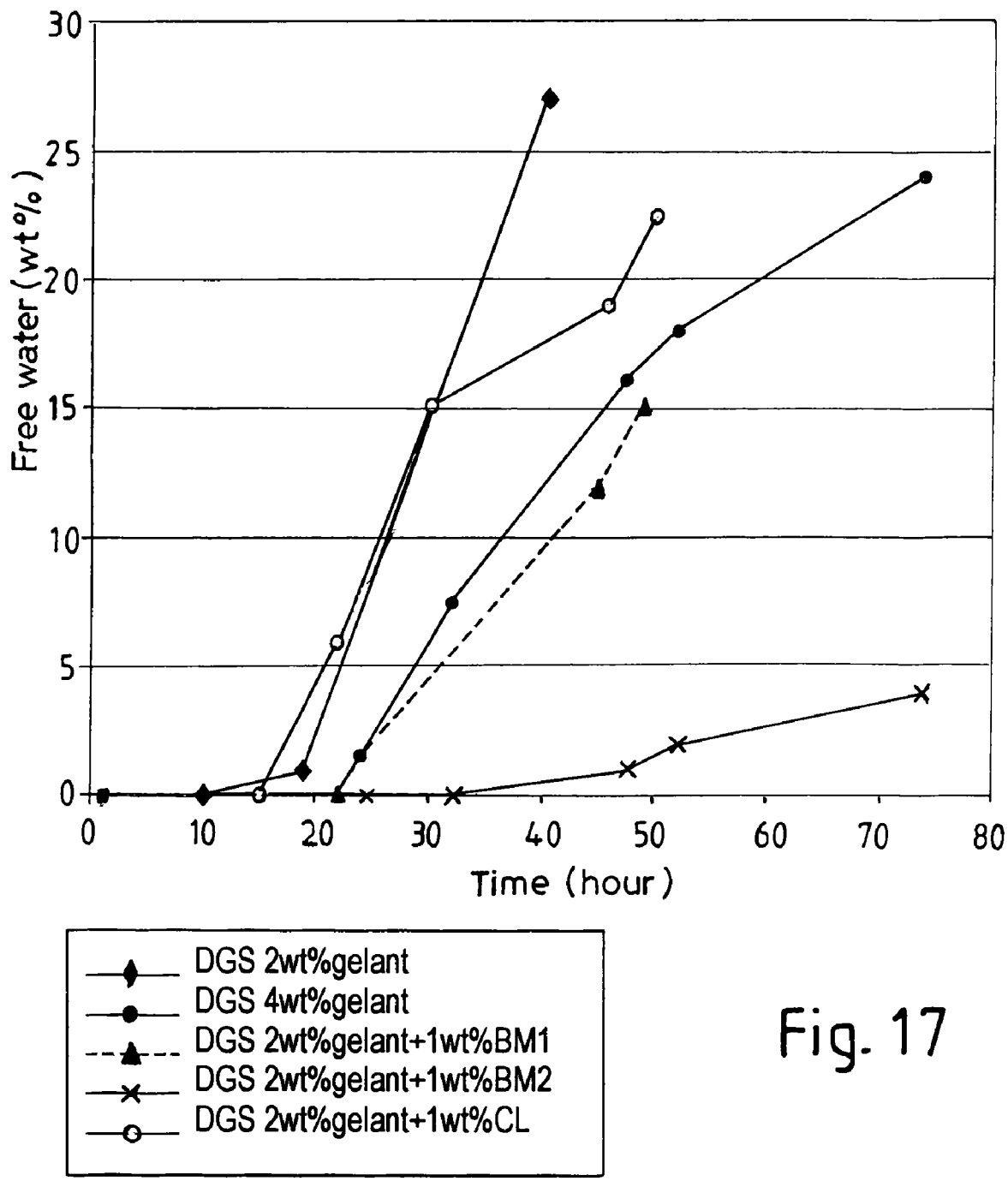
FIG. 17 shows a graph of amount of free water against ageing time for some of the solutions of FIGS. 13 to 16.

Furthermore, as shown by the data in FIG. 17, which is a graph of amount of free water against time, the gel formed by 2 wt % gelant and 1 wt % BM2 showed a considerably reduced rate of free water development compared to that measured for the gel formed from 4 wt % gelant with no added particles. These results indicate that the rate of free water development decreases in the following order:

| CL (spheres) > | BM1 (shorter rods) > | BM2 (longer rods) |
|---|---|---|
| Higher rate | | Lower rate |

Again, this trend shows that the stabilising influence of the particles increases from spheres to rods and from shorter to longer rods.

Figure 18:
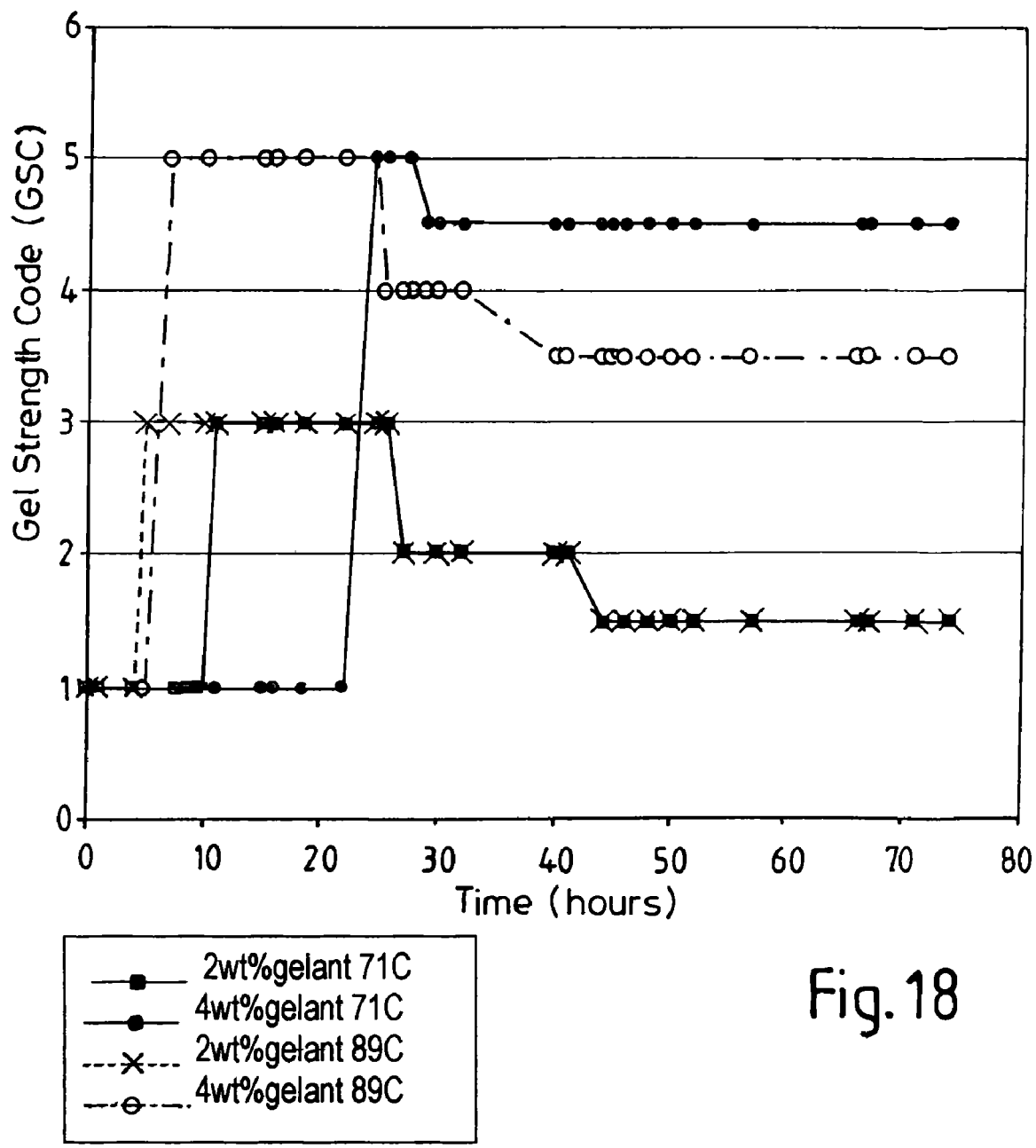
FIG. 18 shows a graph of gel strength code against ageing time for two of the solutions of the graph of FIG. 13 aged at 71° C. combined with results for the same two solutions aged at 89° C.

FIG. 18 shows the effect of increasing the ageing temperature on the gelation performance of particle-free solutions containing 2 and 4 wt % gelant. As expected, at the higher temperature (89° C.), both formulations showed a decreased gel time. Also, the gel containing 4 wt % gelant exhibited a reduced stability.

Figure 19:
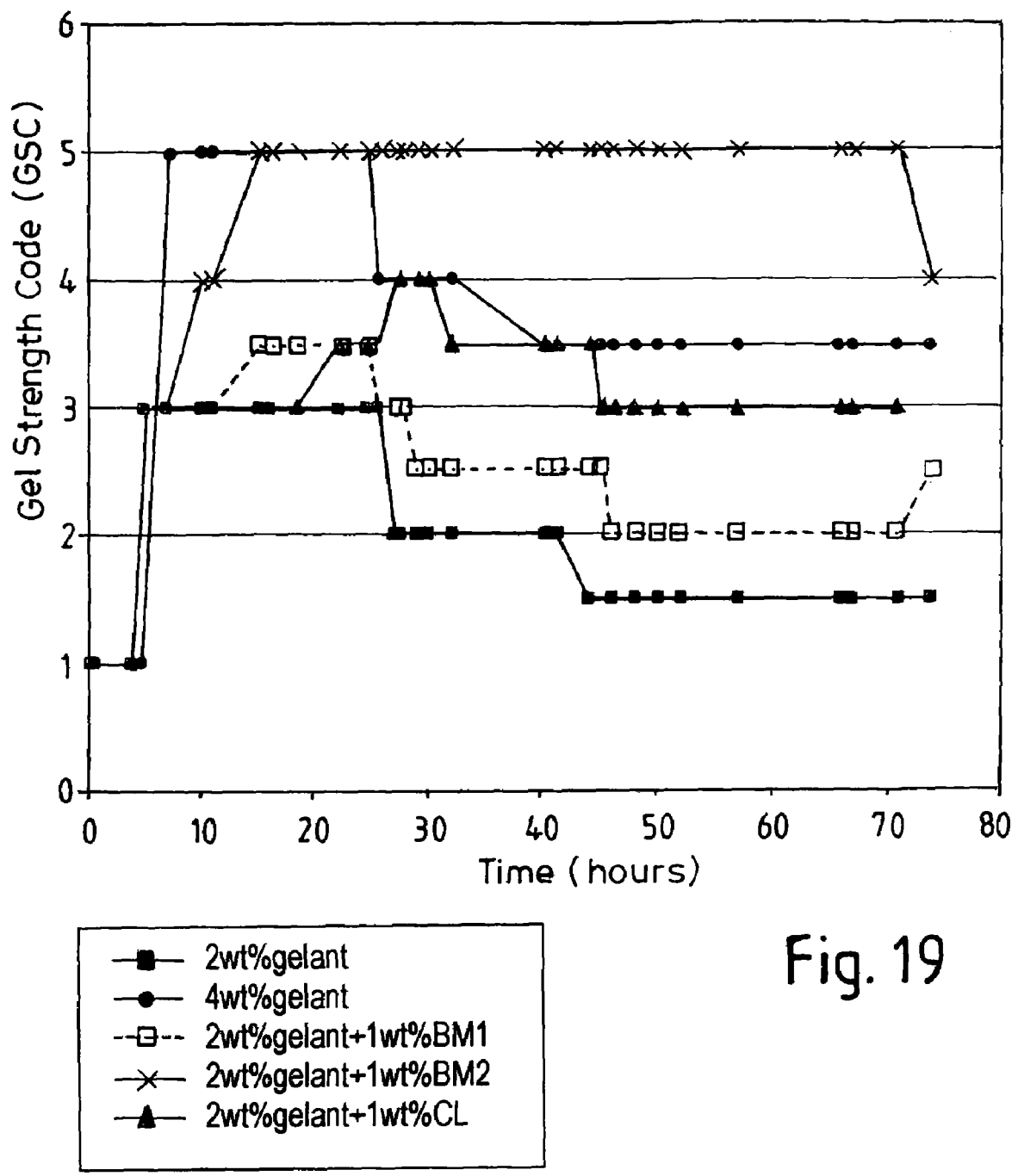
FIG. 19 shows a graph of gel strength code against ageing time combining the results for the two 89° C.-aged solutions of FIG. 18 with the results of three solutions respectively containing BM1 boehmite rods, BM2 boehmite rods and CL coated silica particles also aged at 89° C.
Figure 20:
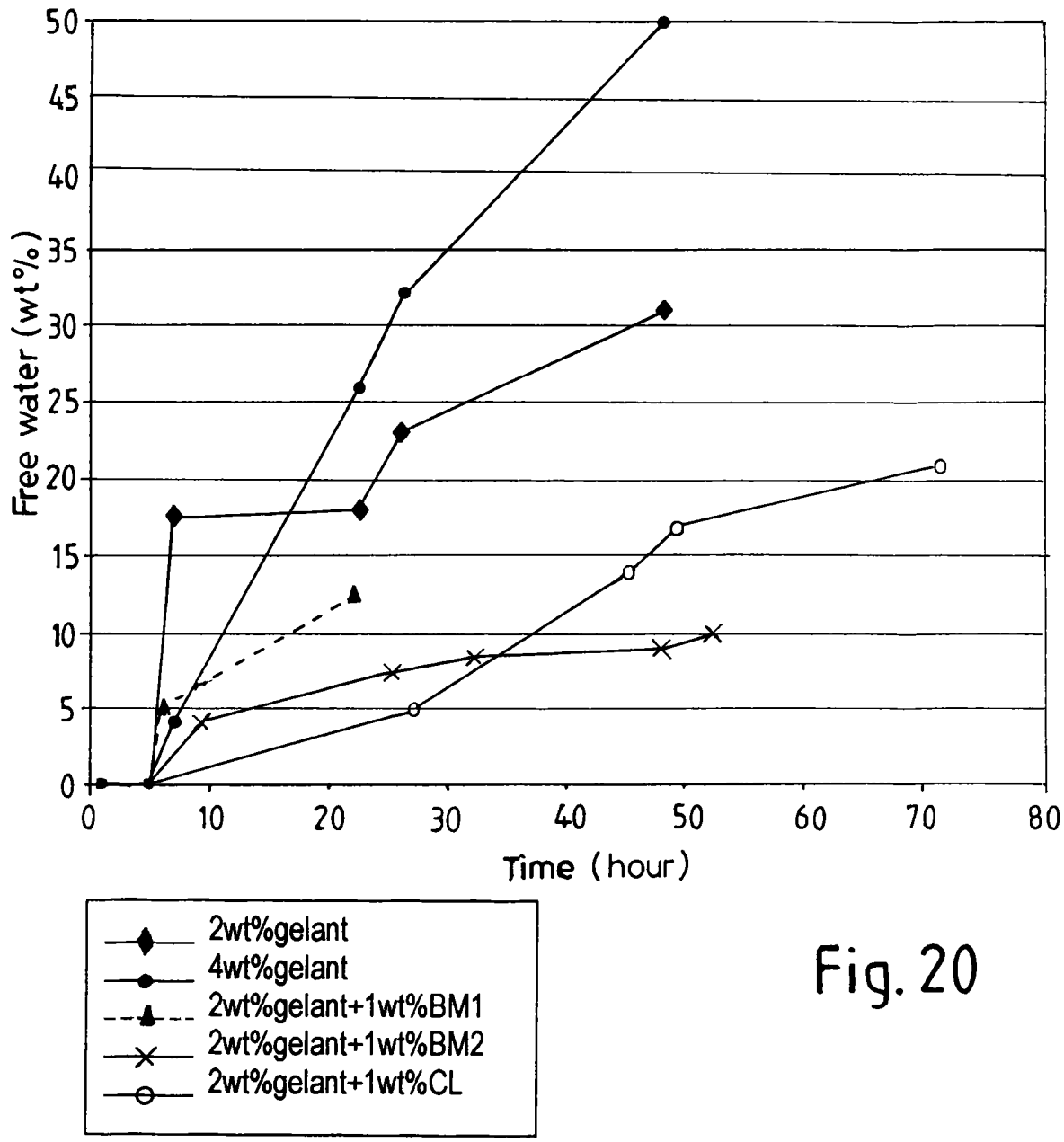
FIG. 20 shows a graph of amount of free water against ageing time for the solutions of FIG. 19.

FIGS. 19 and 20 show the effects of adding the rod-like boehmite particles and the spherical alumina-coated colloidal silica particles in systems containing 2 wt % gelant and aged at 89° C. The data indicate the following trends in terms of the efficiency with which the particles enhance gel strength/stability and reduce the rate of free water development:

| GEL STRENGTH/STABILITY | | |
|---|---|---|
| BM2 (longer rods) >> | BM1 (shorter rods) ≈ | CL (spheres) |
| Higher efficiency | | Lower Efficiency |

| RATE OF FREE WATER DEVELOPMENT | | |
|---|---|---|
| CL (spheres) ≈ | BM1 (shorter rods) > | BM2 (longer rods) |
| Higher rate | | Lower rate |

At this higher temperature (89° C.) the efficiency of the shorter rods (BM1) and the spheres (CL) is similar, but again the longer rods (BM2) show the highest efficiency in terms of enhancing gel strength and stability.

Next, we further studied the effect of adding rod-like boehmite particles or spherical alumina-coated colloidal silica particles to systems containing various concentrations of gelant ($Al_2(OH)_5Cl.2.5H_2O$) and activator (urea). However, in addition to assessing the strength and stability of the gels using the gel strength coding system, we monitored the yield stress of the gels contained in a cylindrical vessel using a Brookfield R/S Rheometer fitted with a V40-20 vane (diameter 0.020 m, height 0.040 m). The ratio (b) of the vane diameter to the vessel diameter was 0.4.

The vane has a height (H) to diameter (D) ratio of 2:1. A stress constant is required to convert the torque (Nm) measured by the rheometer to shear stress (Pa). This constant is calculated as follows:

$$\tau_{prom} = (10^{-4}/\Pi D^3)/(H/D + \frac{1}{3}).$$

Hence, with the V40-20 vane, $\tau_{prom}$=1.706, such that shear stress=1.706×torque.

The constant K-Gamma then converts the rotational rate or position into shear rate/strain values. K-Gamma depends on the diameter ratio, b, according to the relationship:

$$K\text{-gamma}=0.2094/(1-b^2).$$

Thus, when b=0.4, K-gamma=0.2492.

The procedure used to measure the yield stress of the gels was as follows: (1) the gel sample was removed from the ageing oven and cooled to ambient temperature, (2) the vessel containing the gel sample was clamped in a fixed position; (3) the vane was lowered into the centre of the vessel where it was fully covered by the sample; and (4) the vane was rotated at a fixed speed (0.2 revolutions per minute) and the shear stress monitored as a function of time. Early time behaviour was characterized by an increase in shear stress with time. However, at a critical shear stress, the yield stress, the gel sample "failed" such that the gel within the boundaries of the vane became detached from the bulk of the sample. The yield stress is a quantitative diagnostic of gel strength.

Figure 21:
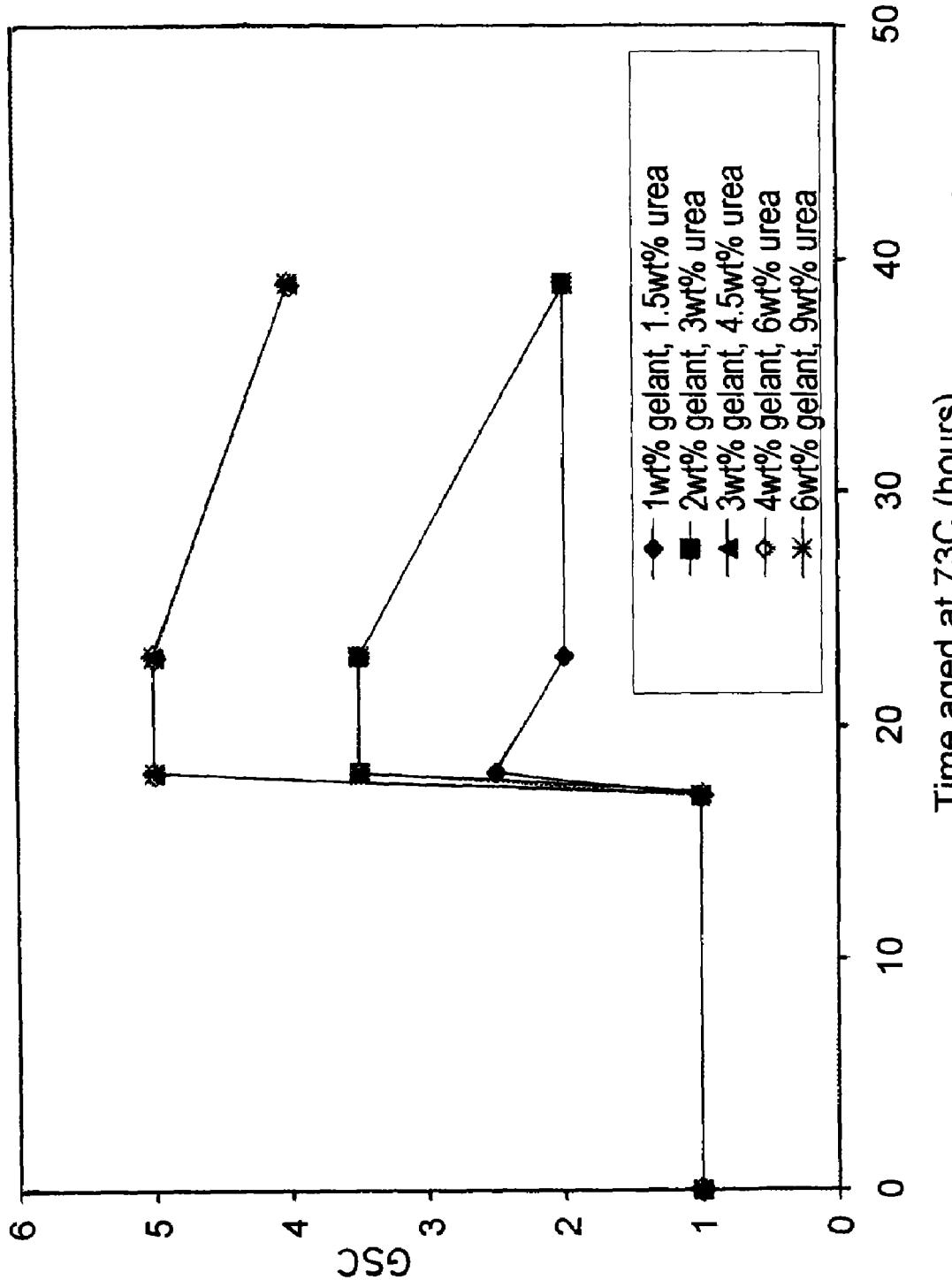
FIG. 21 shows a graph of gel strength code against ageing time at 73° C. for solutions having gelant concentrations in the range 1 to 6 wt % and constant gelant/activator (w/w) ratios of 2/3.
Figure 22:
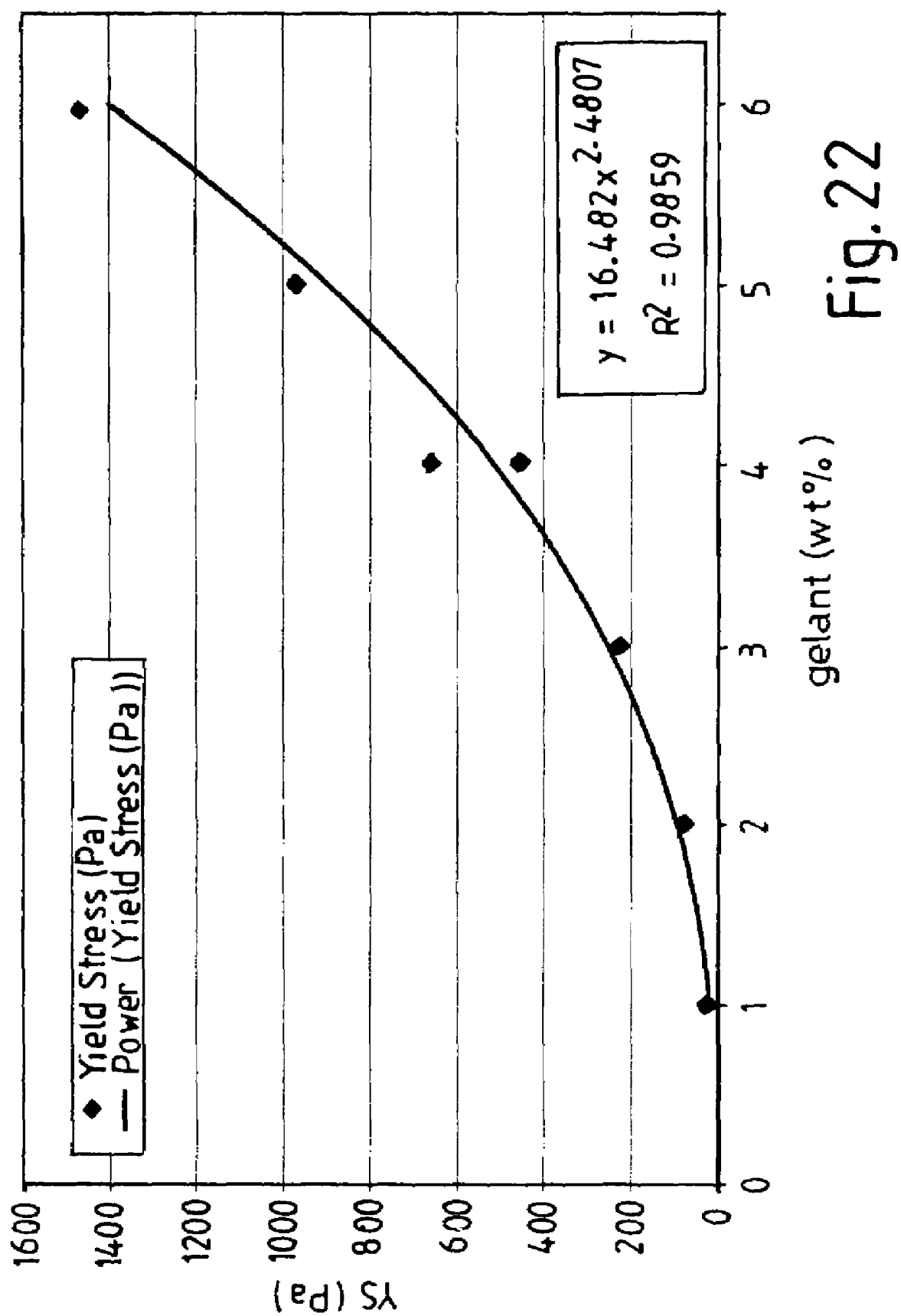
FIG. 22 shows a graph of vane yield stress against gelant concentration for the solutions of FIG. 21 aged for 18 hours at 73° C., FIGS. 23a and b show graphs of respectively gel strength code and vane yield stress against aging time at 73° C. for solutions containing 2 wt % gelant+particles and 3 wt % activator, FIGS. 24a and b show graphs of respectively gel strength code and vane yield stress against aging time at 73° C. for solutions containing 3 wt % gelant+particles and 4.5 wt % activator, FIGS. 25a and b show graphs of respectively gel strength code and vane yield stress against aging time at 73° C. for solutions containing 4 wt % gelant+particles and 6 wt % activator.

FIG. 21 shows the effect of gelant concentration, varied in the range 1-6 wt %, on gel time, strength and stability as determined by monitoring gel strength code. Since the activator/gelant (w/w) ratio was constant (0.66), all five solutions formed gels after the same ageing time, 18 hours. Gel strength code monitoring differentiated the gels with gelant concentrations in the range 1 to 3 wt %, but failed to differentiate the gels with gelant concentrations in the range 3 to 6 wt %. In contrast, as shown in FIG. 22, the vane yield stress measurement gave a quantitative estimate of gel strength throughout the gelant concentration range 1 to 6 wt %.

Three series of experiments were then performed. In each series gel strength codes and yield stress data were gathered for a number of solutions aged at 73° C. In series 1 the total amount of gelant+particles in each solution was 2 wt %; in series 2 the total amount of gelant+particles in each solution was 3 wt %; and in series 3 the total amount of gelant+particles in each solution was 4 wt %. Across all the solutions the amount of activator was 1.5×the amount of gelant+particles. The sample volume for each of the yield stress measurements was 100 mL.

Figure 23A:
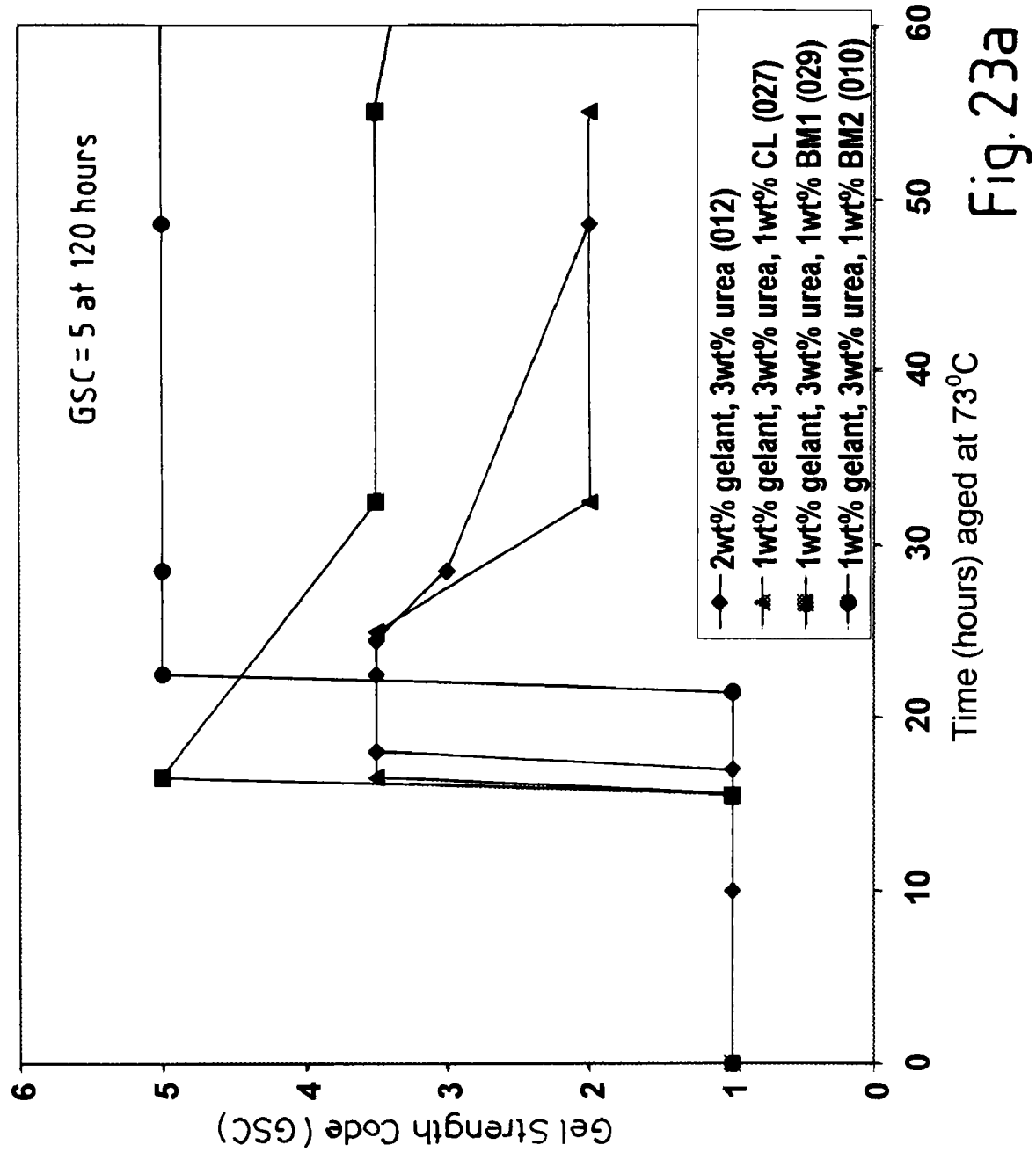
Figure 23B:
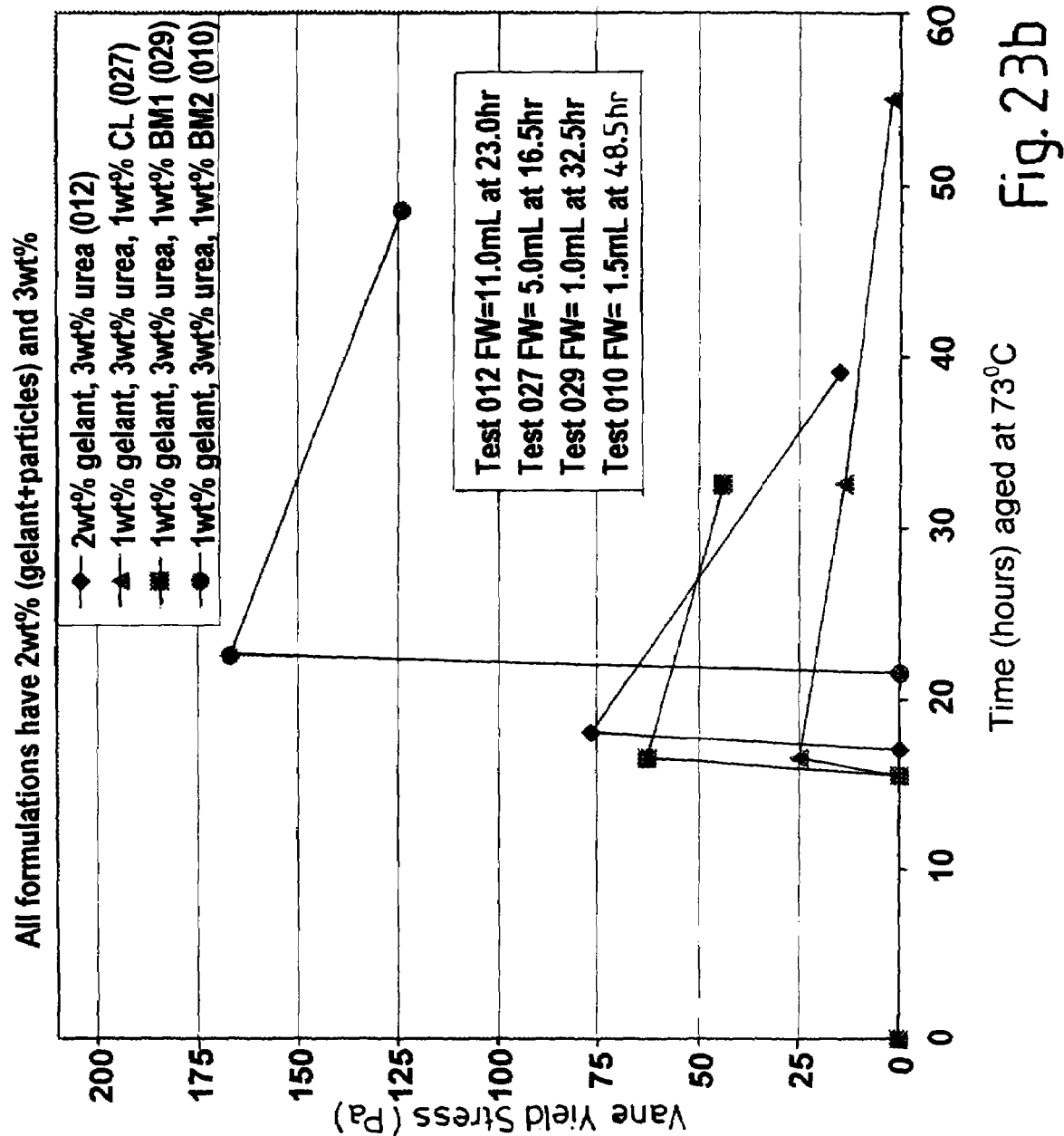
Figure 24A:
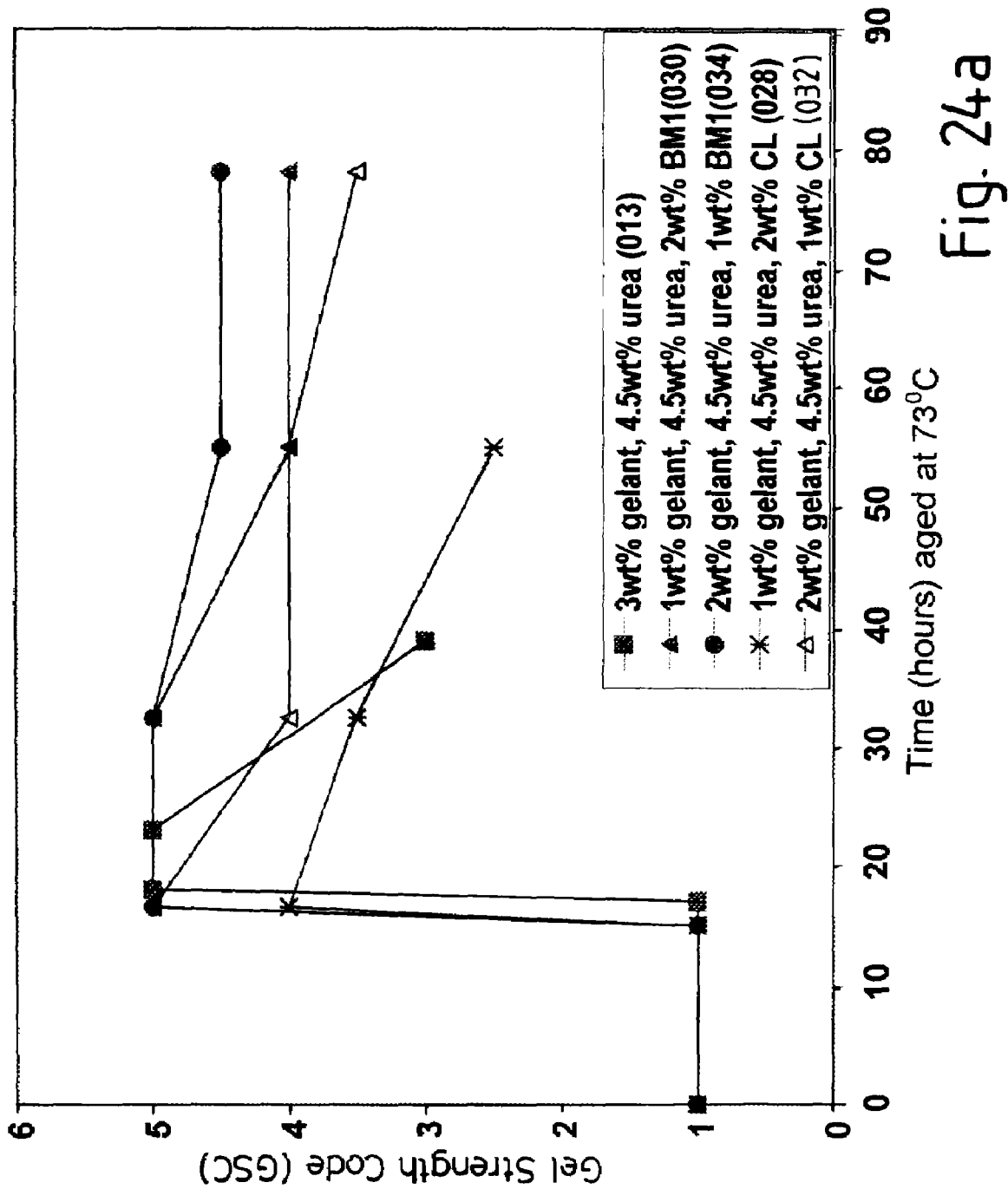
Figure 25A:
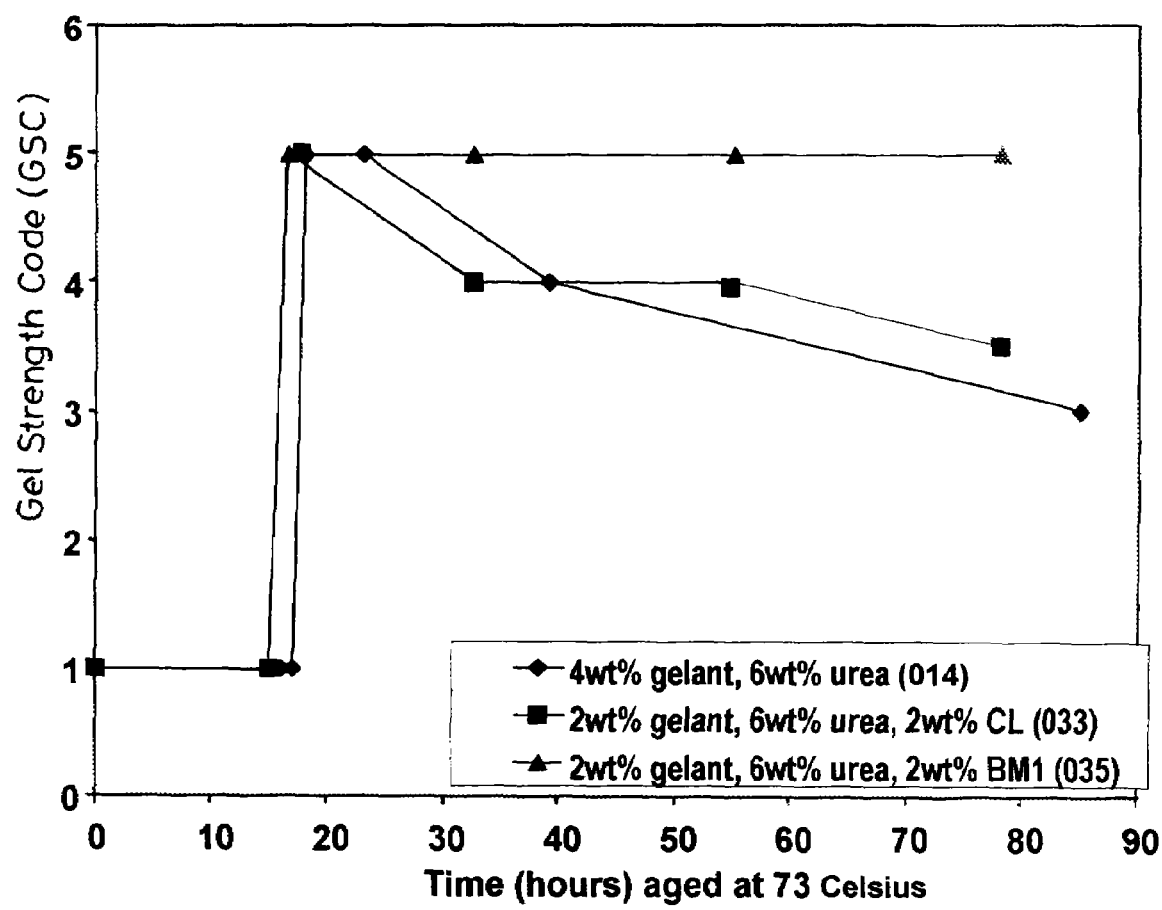
Figure 25B:
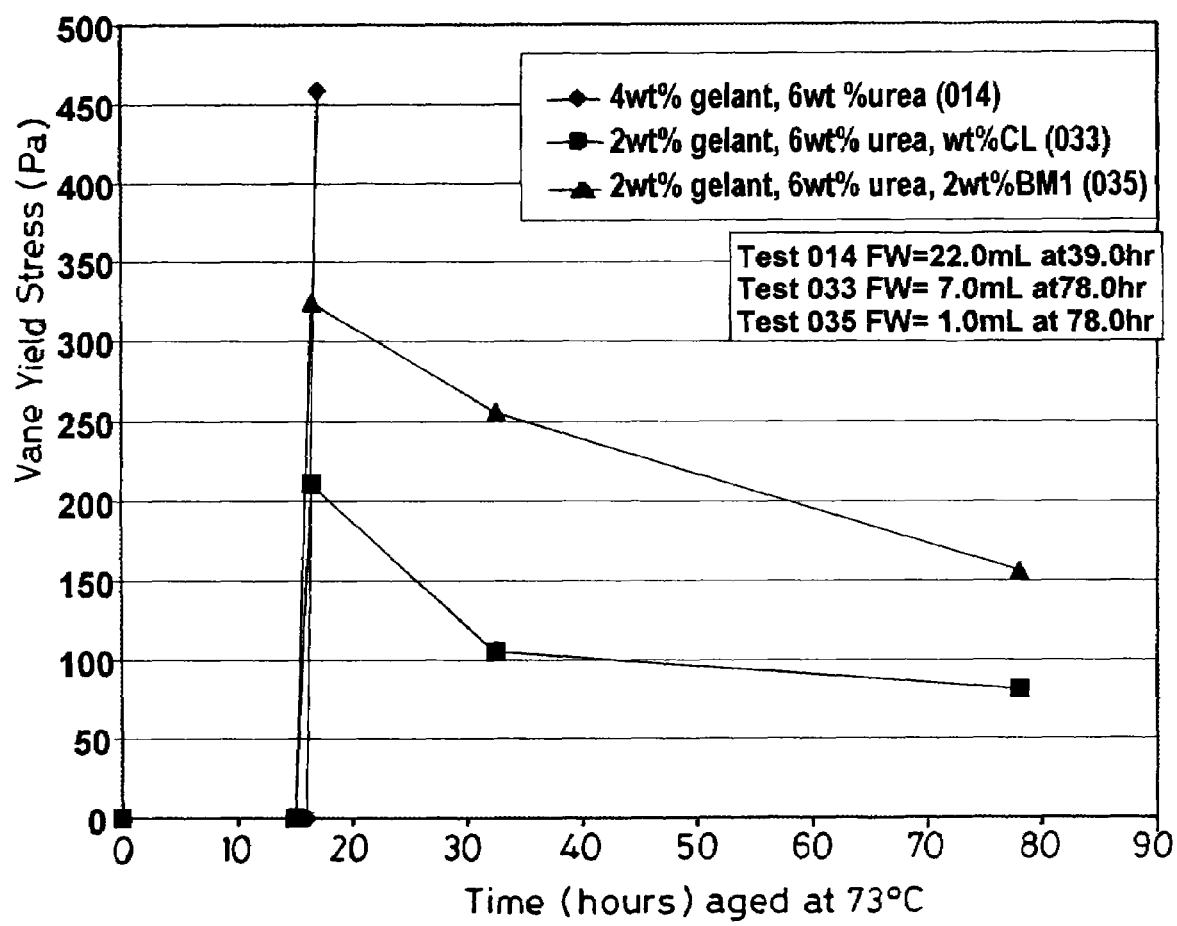

FIGS. 23 to 25 show the results of these experiments. In each figure, for the same samples, the upper plot shows gel strength codes against ageing time and the lower plot shows vane yield stresses against ageing time. Representative data regarding the rate of development of free water (FW) is also given in each lower plot. In order to measure vane yield stress against ageing time, replicate samples of the same solution were prepared and aged under the same conditions, at each time a different replicate being used to perform the respective vane yield stress measurement.

From FIGS. 23 to 25 the following trends can be identified:

For series 1 with 2 wt % (gelant+particles), the strength of the freshly formed gel increases in the order: 1 wt % gelant+1 wt % CL (spherical particles)<2 wt % gelant≈1 wt % gelant+1 wt % BM1 (shorter rods)<1 wt % gelant+1 wt % BM2 (longer rods).

For series 2 with 3 wt % (gelant+particles), the combination with 2 wt % gelant+1 wt % CL forms a stronger and more stable gel than the combination 1 wt % gelant+2 wt % CL. The same trend is observed for the equivalent blends containing gelant and BM1 (shorter rods).

Relative to the solutions without added particles, the addition of spherical or rod-like particles stabilizes the gel as evidenced by the vane yield stress measurements and rate of free water development. The efficiency with which the particles stabilize the gel increases in the order: CL (spherical particles)<BM1 (shorter rods)<BM2 (longer rods).

Figure 26:
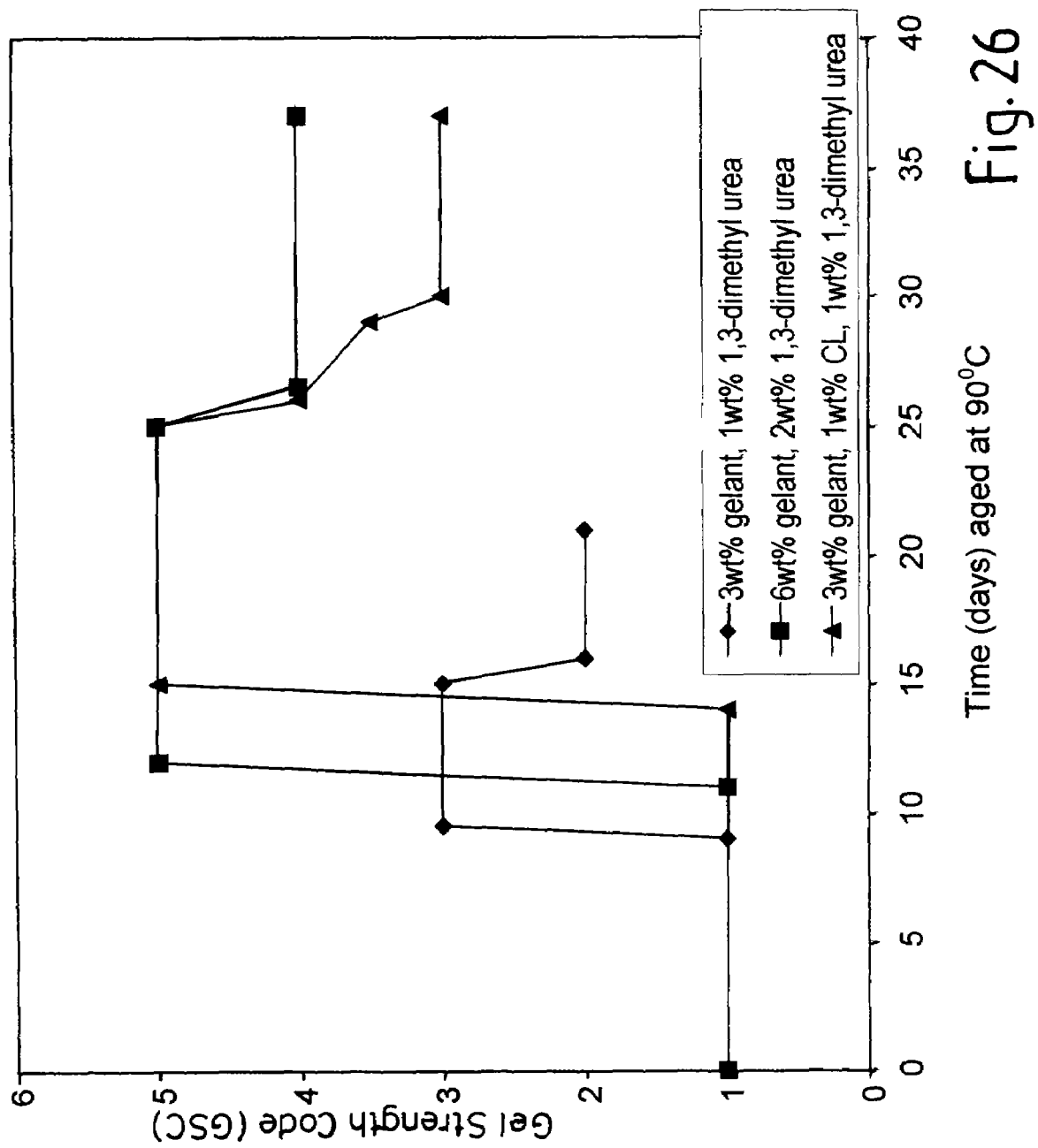
FIG. 26 shows a graph of gel strength code against aging time at 90° C. for solutions containing gelant, 1,3-dimethyl urea activator and CL particles.

Finally, the gel-stabilizing effect of CL (spherical particles) was confirmed by adding CL particles to a system activated using the urea derivative, 1,3-dimethyl urea and aged at 90° C. The gel strength codes data shown in FIG. 26 indicate that the addition of 1 wt % CL particles to a system containing 3 wt % gelant ($Al_2(OH)_5Cl.2.5H_2O$) and 1 wt % 1,3-dimethyl urea increased the maximum gel strength from 3 to 5 and improved the stability of the gel from 5 to >22 days.

System 2: Coated Rod-shaped Particles

Silica-coated boehmite rods were suspended in silicate delayed-gelation solutions. Again the efficiency with which the rods enhance gel strength and stability was compared to that of an equivalent dosage of colloidal silica particles.

The silicate gelling solutions were formed by adding ammonium sulphate (the activator) to an aqueous solution of sodium silicate (the gelant). The stock sodium silicate solution (supplied by Sigma-Aldrich Company, Gillingham, Dorset, U.K.) contained 14 wt % NaOH, 27 wt % $SiO_2$ and 59 wt % water. By dilution with deionised water, sodium silicate solutions containing 1, 2 and 4 wt % $SiO_2$ were prepared. Ammonium sulphate was then dissolved in the diluted sodium silicate solutions to give the gelation solutions detailed below in Table 2.

TABLE 2

Compositions of silicate delayed gelation solutions

| $SiO_2$ (wt %) | Molar ratio $SO_4/SiO_2$ |
|---|---|
| 1 | 0.20 |
| 1 | 0.25 |
| 1 | 0.3 |
| 1 | 0.4 |
| 2 | 0.5 |
| 2 | 0.6 |
| 2 | 0.7 |
| 2 | 0.8 |
| 4 | 0.7 |

TABLE 2-continued

Compositions of silicate delayed gelation solutions

| $SiO_2$ (wt %) | Molar ratio $SO_4/SiO_2$ |
|---|---|
| 4 | 1 |
| 4 | 1.5 |

Figure 27:
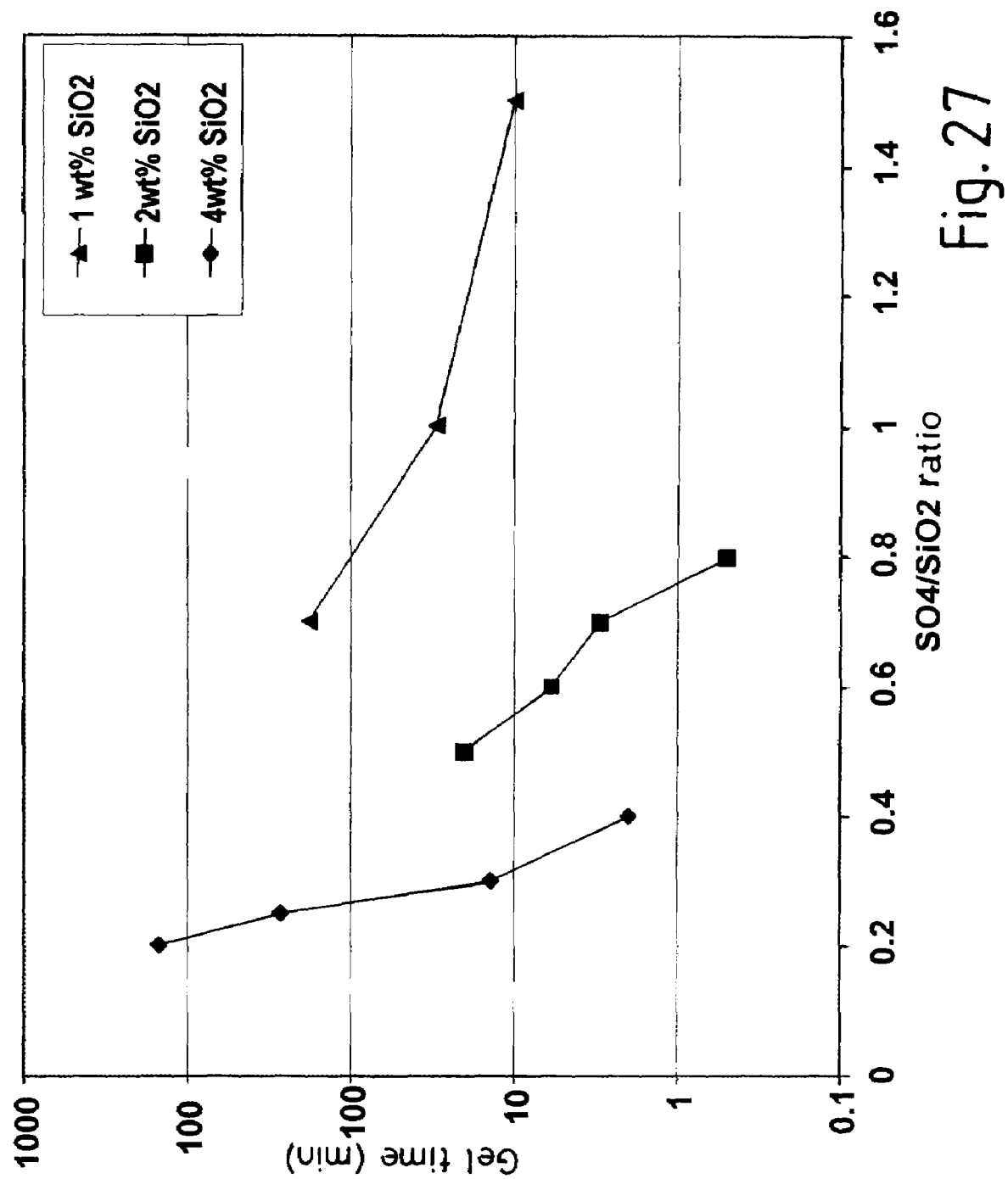
FIG. 27 shows a graph of gel time against molar ratio $SO_4/SiO_2$ for silicate delayed gelation solutions aged at 20° C.

The solutions listed in Table 2 were then aged under ambient laboratory conditions (20° C.) to form space-filling silicate gels. FIG. 27 shows the observed relationships between gel time and molar ratio $SO_4/SiO_2$. The relationships are consistent with those published in R. C. Merrill and R. W. Spencer, "Gelation of sodium silicate: Effect of sulphuric acid, hydrochloric acid, ammonium sulphate and sodium aluminate", Reynold C. Merril and Robert W. Spence, Philadelphia Quartz Company, Philadelphia, Pa., 1949.

The solution containing 1 wt % $SiO_2$ with ammonium sulphate added to give a molar ratio $SO_4/SiO_2$=1 formed a gel after 30 minutes (see FIG. 27). This control solution was used to evaluate the effects of added particles. Spherical silica particles were added in the form of the product Ludox HS-40 (available as a 40 wt % suspension from Sigma-Aldrich Company Ltd., Gillingham, Dorset, UK; mean particle diameter=40 nm, surface area ~220 $m^2$/g, sodium stabilizing counterion). The rod-like particles were added in the form of silica-coated BM1 and BM2 boehmite rods. The silica-coated BM1 rods (which had an average length of about 100 nm) were designated Si-Boeh-100 and the silica-coated BM2 rods (which had an average length of about 200 nm) were designated Si-Boeh-200.

Figure 28:
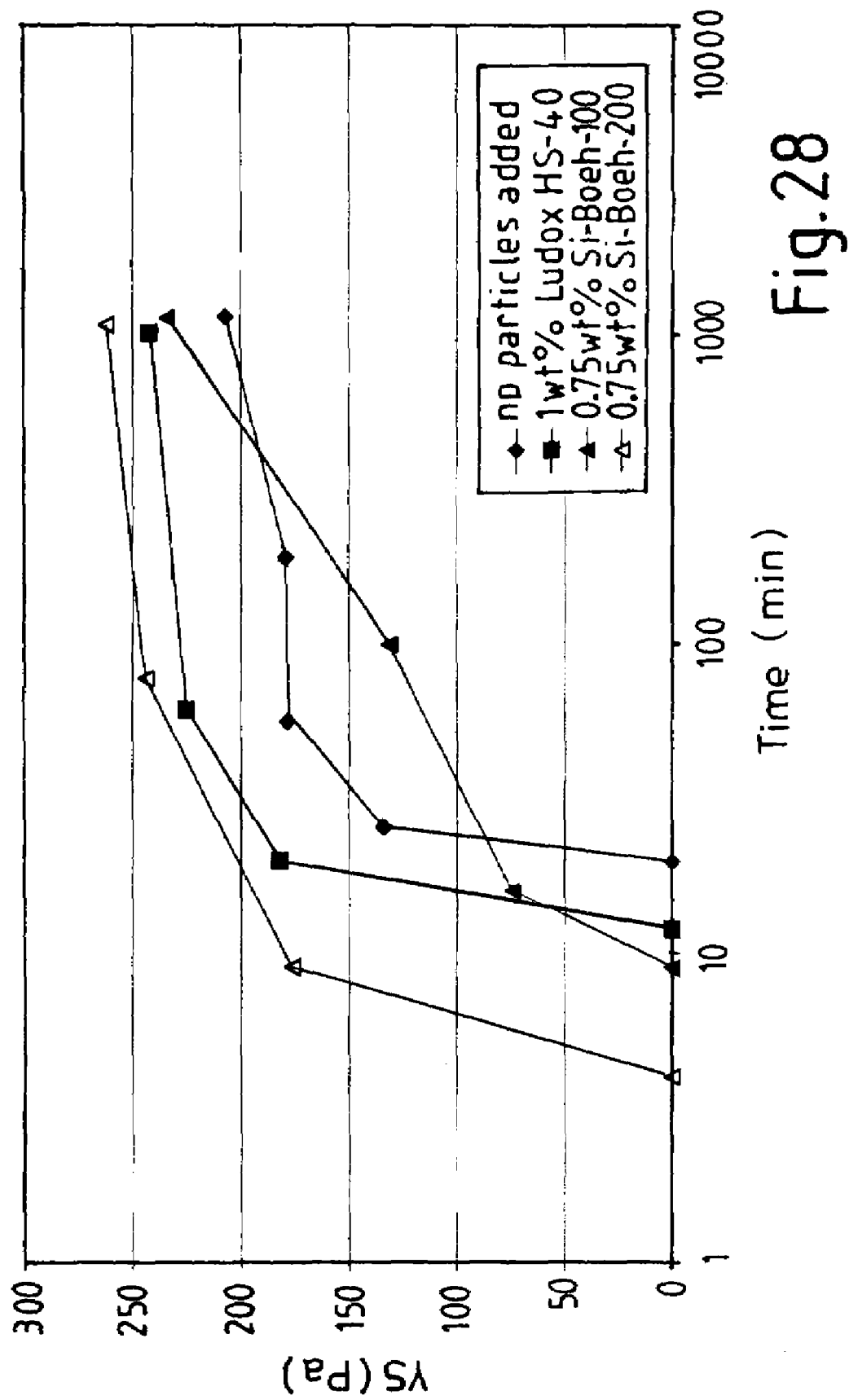
FIG. 28 shows a graph of vane yield stress against aging time at 20° C. for systems based on a silicate delayed-gelation solution.

Yield stress data (shown in FIG. 28) were then gathered for solutions respectively containing: no particles, 1 wt % Ludox HS-40, 0.75 wt % Si-Boeh-100, and 0.75 wt % Si-Boeh-200.

The addition of spherical or rod-like particles accelerated the gelation process such that the observed gel times decreased in the order: no particles>spherical particles>shorter rods>longer rods. A comparison of the vane yield stresses after 17 hours (1020 min) ageing shows that the presence of the particles enhances gel strength and that the efficiency with which the particles enhance strength decreases in the order: longer rods>shorter rods≈spherical particles.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A delayed-gelation system for selective placement in well formation zones, comprising:
   an aqueous delayed-gelation solution comprising a dissolved aluminium salt which is capable of hydrolysis, in use, to form a gel,
   wherein the solution of said aluminium salt contains suspended inorganic particles which comprise alumina coated silica.

2. The system according to claim 1, wherein the inorganic particles are elongate.

3. The system according to claim 2, wherein the elongate inorganic particles have a mean aspect ratio of at least 8.

4. The system according to claim 2, wherein the elongate inorganic particles have a mean aspect ratio of at least 16.

5. The system according to claim 2, wherein the suspended colloidal particles have particle dimensions not larger than 200 nm.

6. A delayed-gelation system for selective placement in well formation zones, comprising:
   an aqueous delayed-gelation solution comprising a dissolved metal silicate salt which is capable of hydrolysis, in use, to form a gel,
   wherein the solution of said salt contains suspended colloidal inorganic particles which are boehmite coated with silica.

7. The system according to claim 6, wherein the suspended colloidal particles have particle dimensions not larger than 200 nm.

* * * * *